(12) United States Patent
Fujita et al.

(10) Patent No.: US 6,349,349 B1
(45) Date of Patent: Feb. 19, 2002

(54) SYSTEM FOR LINKING A MAIN CONTROL UNIT TO DATA RECEIVING AND TRANSMITTING UNITS AND A FIRST AND SECOND STORAGE UNITS BY A NETWORK

(75) Inventors: Hiroyuki Fujita; Norikazu Ito; Satoshi Yoneya; Masakazu Yoshimoto; Satoshi Katsuo, all of Kanagawa; Tsutomu Yamamoto, Tokyo; Jun Yoshikawa, Kanagawa; Shintaro Mizutani, Kanagawa; Satoshi Yutani, Kanagawa; Koichi Sato, Tokyo; Tomohisa Shiga, Kanagawa; Gentaro Okayasu, Tokyo; Yoji Shimizu, Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/182,176

(22) Filed: Oct. 29, 1998

(30) Foreign Application Priority Data

Oct. 31, 1997 (JP) ............................................. 9-301196

(51) Int. Cl.[7] ............................................. G06F 13/14
(52) U.S. Cl. .............................. 710/35; 710/6; 710/129; 709/231; 348/7
(58) Field of Search .............................. 710/6, 129, 35; 709/231; 348/7

(56) References Cited

U.S. PATENT DOCUMENTS

| | | | |
|---|---|---|---|
| 5,586,264 A | * 12/1996 | Belknap et al. | 709/219 |
| 5,603,058 A | * 2/1997 | Belknap et al. | 710/35 |
| 5,805,821 A | * 9/1998 | Saxena et al. | 709/231 |
| 6,144,400 A | * 11/2000 | Ebisawa | 348/7 |

FOREIGN PATENT DOCUMENTS

| | | |
|---|---|---|
| EP | 0 633 694 | 1/1995 |
| EP | 0 653 884 | 5/1995 |
| EP | 0 701 373 | 3/1996 |
| WO | 91 03112 | 3/1991 |

OTHER PUBLICATIONS

Gelman, A.D., Et Al.: "A Store–and–Forward Architecture for Video–on–Demand Service" Proceedings of the International Conference on Communications, US, New York, IEEE, vol. 2, Dec. 18, 1991, pp. 842–846, XP000269608.

Patent Abstracts of Japan, vol. 1996, No. 06, Jun. 28, 1996 & JP 08 056326 (Sony Corp.), Feb. 27, 1996.

Patent Abstracts of Japan, vol. 1997, No. 02, Feb. 28, 1997 & JP 08 280010 (Sony Corp.), Oct. 22, 1996.

* cited by examiner

Primary Examiner—Thomas Lee
Assistant Examiner—Abdelmoniem Elamin
(74) Attorney, Agent, or Firm—Frommer Lawrence & Haug LLP; William S. Frommer; Darren M. Simon

(57) ABSTRACT

This invention relates to an apparatus for storing and transmitting AV data. A receiving buffer unit for storing AV data temporarily, a transmitting buffer unit for storing temporarily the AV data to be transmitted, and a primary storage unit for storing AV data and a secondary storage units for storing AV data are connected to each other by means of a subnetwork. A server control unit for controlling the respective units is connected to the subnetwork. Since these units are connected by means of the subnetwork, any restriction is not given to spaces for installing the units. The capacities of the primary and secondary storage units and the transmitting buffer unit are selected so that they become larger in order of the secondary storage unit, the primary storage unit and the transmitting buffer unit. Thereby, the storage units and the transmitting buffer unit are controlled in a hierarchical form. This makes it possible to construct an AV sever system having large capacity and good responsivity with good cost balance.

22 Claims, 22 Drawing Sheets

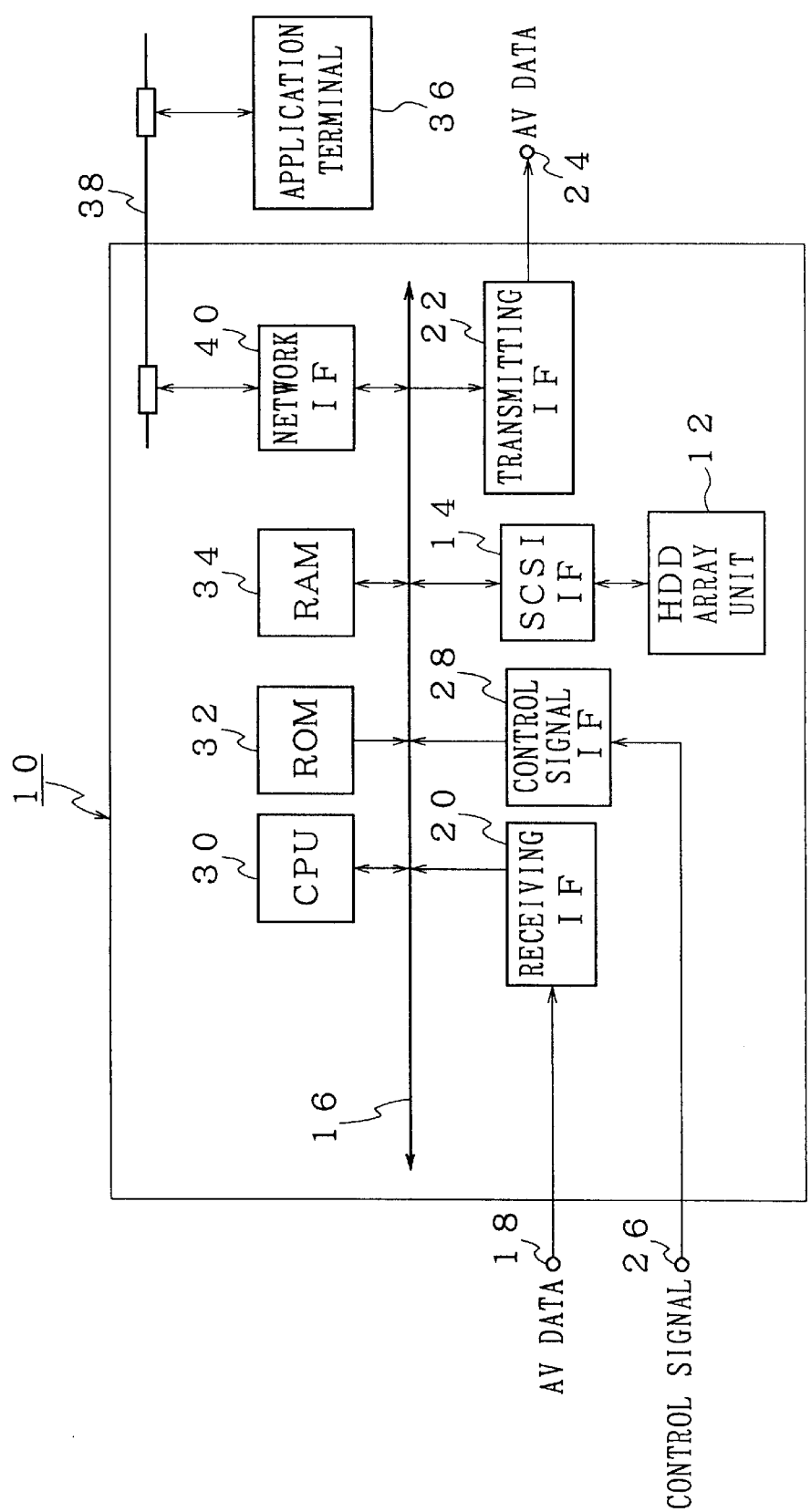

SYSTEM FOR LINKING A MAIN CONTROL UNIT TO DATA RECEIVING AND TRANSMITTING UNITS AND A FIRST AND SECOND STORAGE UNITS BY A NETWORK

BACKGROUND OF THE INVENTION

1. Field of the Invention

The present invention relates to an apparatus for storing data including audio and/or video (AV) data and for transmitting them, suitable for being applied to an AV server device for storing and reproducing AV data etc. More specifically, the invention relates to an apparatus making it possible to construct a data processing system in which real time control can easily be carried out and excellent responsivity can be exhibited, by connecting an receiving buffer unit for storing temporarily AV data etc., an transmitting buffer unit for transmitting AV data etc. and the like unit by means of a network means.

2. Description of the Prior Art

A structure shown in FIG. 22 is known as an AV server device which is a type of an apparatus for storing AV data etc., and for transmitting the desired AV data at real time.

In the FIG. 22, a HDD (Hard Disk Drive) array unit 12 (which will be referred to as a disk array unit, hereinafter) having such an array structure that a plurality of hard disk drives are connected in parallel with each other is provided for using as a storage means for storing AV data, and this disk array unit 12 is connected to an internal bus 16 through an SCSI interface 14.

To the internal bus 16, a receiving interface 20 for AV data supplied from a terminal 18 is connected so that the received AV data are stored in the disk array unit 12, and thereto an transmitting interface 22 is connected through the internal bus 16 so that the reproduced AV data are transmitted from a transmitting terminal 24.

A control signal interface 28 for a real time control through a terminal 26 is also connected to the internal bus 16.

As the control signal, the following can be taken into consideration: a signal transmitted from an editing unit (not shown) connected to an AV server device 10, a signal synchronized with sending-out-timing signal transmitted from a program sending-out unit (not shown) disposed in connection with an application terminal 36 in case where this AV server device 10 is illustratively applied to a commercial sending-out system.

Furthermore, the followings are connected to this internal bus 16: a CPU 30 for controlling the whole of the AV server device, a ROM 32 including various control programs, and a RAM 34 for storing, for example, file control information for AV data stored in the disk array unit 12. In addition to this, in this example, to the internal bus 16 a network interface 40 is connected, and the present AV server device is connected to the outer application terminal 36 (terminal equipment such as a workstation or a personal computer) from this network interface 40 through a network 38.

Reproducing operations for AV data stored in the AV server device are illustratively explained hereinafter.

Firstly, the application terminal 36 sends a file information acquiring command to the AV server device 10 through the network 38. Said file information acquiring command orders the indication of the information relating to the file storing the AV data to be reproduced. Next, CPU 30 of the AV server device 10 transfers the file information stored in RAM 34 therefrom to the application terminal 36 in response to the file information acquiring command received from the application terminal 36.

Then, the application terminal 36 sends to the AV server device 10 a file open command that is a command to operate the file storing AV data to be reproduced on basis of the received file information. The CPU 30 of the AV server device 10 reads out the file information stored in the RAM 34 on the basis of the received file open command and waits for a next command from the application terminal 36. Next, the application terminal 36 issues to the AV server device 10 a reproducing command relating to the file received the file open command. The CPU 30 of the AV server device 10 receives said reproducing command and issues a reproducing command relating to the file to be reproduced to the disk array unit 12 through SCSI interface 14 according to the read out file information. The disk array unit 12 receives said reproducing command and allows the hard disk drive inside the unit 12 to be accessed. Thereby, the AV data are reproduced from the area where said file to be reproduced is stored in hard disk of the hard disk drives and the reproduced AV data are transferred to the internal bus 16 through the SCSI interface 14. The CPU 30 controls the internal bus 16 so that the AV data transferred into the internal bus 16 are transmitted to the transmitting interface 22. Said CPU 30, thus, transmits the AV data to the outside via the transmitting interface 22.

In the above AV server device 10, all of the receiving interface 20, the SCSI interface 14 and the transmitting interface 22 are connected to the internal bus 16, and the CPU 30 controls all of them. All of the AV data are stored in the disk array device 12. Thus, there remain the following problems.

Firstly, the number of the receiving and transmitting channels is limited by a transfer rate at the internal bus. This is because the receiving interface 20 and the transmitting interface 22 are directly connected to the internal bus 16 and consequently the number of the receiving and transmitting channels is limited by a restriction to hardware (a transfer rate at the internal bus).

For example, when the transfer rate at the internal bus 16 is 20 Mbyte/sec (=160 Mbps), the total number of the receiving and transmitting channels is 8 at maximum in case where the compression rate for AV data is 20 Mbps.

Secondly, since the receiving interface 20 and the transmitting interface 22 are directly connected to the internal bus 16, it is impossible to arrange receiving means, transmitting means, storage means, and the like in a physically separate form. Thus, a design for construction of an AV server system is restricted.

Thirdly, the reliability of the disk array unit 12 deteriorates since the disk array unit 12 is controlled at real time in recording/reproducing AV data. For example, it will be assumed that in case where a plurality of the transmitting interfaces 22 exist, these plural transmitting interfaces are simultaneously operated.

In order that transmitting AV data from the respective transmitting interfaces are not interrupted, it is necessary that a specified amount of data reach each of the transmitting interfaces within a specified period. This requires real time reading about reading data in the hard disk.

In hard disks, seek time and rotation-waiting time vary depending on the position of a head. Therefore, in order to reproduce AV data without interruption, it is necessary that seek time and rotation waiting time are set to the worst value. To obtain a transfer rate necessary for this, it is necessary to provide many hard disks and operate these disks in parallel.

The reliability of a hard disk is obtained on the basis of retry processing of the access to the hard disk. Therefore, when the retry number for a hard disk is limited to a minimum number (10 or less in usual cases), the error rate is deteriorated from 100 to 1000 times. Where hard disks are arrayed and real time reading is required, the retry number for the hard disks has no choice but to be limited. As a result, the reliability as a disk array unit drops.

Fourthly, to increase storage capacity, only addition of the disk array units 12 is permissible. When a tape device (a tape changer device using many magnetic tapes, or the like), which is low-priced for capacity, attempts to be used because of a high price of a hard disk drive, this tape changer must also be connected to the internal bus 16. As a result, transfer capacity of the internal bus 16 is further consumed, so that the number of receiving and transmitting channels, which can be handled, is reduced for that.

Fifthly, the period from the arrival of a file open command from the application terminal 36 to the reproduction of the file to be reproduced is decided by access time to the hard disk drive. Since this period is substantially decided by the maximum value (several ten msec.) of seek time and rotation waiting time of the hard disk drive, the responsivity of the AV server 10 is decided by the performance of the hard disk drive itself. As a result, a high-speed responsivity thereof cannot be expected so far as the hard disk drive is used.

SUMMARY OF THE INVENTION

Thus, this invention solves these problems in the prior art, and it is an object of this invention to provide an apparatus for storing and transmitting data, which can be illustratively applied to an AV server device, the apparatus making it possible to construct an AV server system or the like which can make real time control easy and have excellent responsivity. To solve the aforementioned problems, the present invention provides preferably an apparatus for storing and transmitting data comprising a first storage means for storing the AV data received from the outside, a second storage means for storing said AV data, a data transmitting means for storing temporarily said AV data and transmitting them to the outside, and a main control means for controlling said data transmitting means, said first storage means and said second storage means. In this invention, said network means links each of said data transmitting means, said first storage means and said second storage means. Since the number of receiving and transmitting channels is decided by the network means itself, the number more than the one of the prior art can be kept sufficiently in the present invention. It is not feared that it is limited by capacity of the internal bus. Each of said data transmitting means, said first storage means and said second storage means can be arranged discretely because their physical arrangement or distances are not limited.

Since data transfer, in this invention, among the first and second storage means and the data transmitting means, is implemented as communication on an ordinary network and the data are reproduced at real time from the transmitting means, real time processing between the storage means and the transmitting means is not required.

Therefore, this makes it possible to take measures for keeping reliability of the storage means sufficiently, and consequently, for example, in case where a disk array unit or the like is used, the number of retry thereto can be set a larger value. This makes it possible to improve reliability of the disk array unit to a large extent.

Furthermore, in this invention, a data transmitting means stores temporarily said data and the stored data are transmitted to the outside by the reproducing command and thus, the responsivity to the reproducing command can be improved to a large extent.

In the present invention, the main control means controls said data transmitting means, said first storage means and said second storage means so that said second storage means stores at least said data stored temporarily in the transmitting means and said first storage means stores at least said data stored in the second storage means. This makes the data hierarchikal.

According to the present invention, an AV server device having large capacity and good responsivity can be constructed with good cost balance. Further, according to this structure, even if hard disk units are used as the storage means, real time processing to hard disk units is not required.

A method for storing and transmitting data of this invention includes preferably the steps of: storing said data received from the outside in said data storage means; transferring said data from the data storage means to said data transmitting means through said network means by deleting specified data stored previously in said data transmitting means therefrom when the stored data are transferred to said transmitting means where the transmitting means has less capacity than that is needed for storing said transferred data; and storing temporarily said transferred data in said data transmitting means.

Further, the storage means of the apparatus of this invention may be composed of only one storage means. In this case, this apparatus may be used in the broadcasting station where there is only a relatively small area for installing it.

A further understanding of the nature and advantages of the invention may be realized by reference to the following portions of the specification and drawings.

BRIEF EXPLANATION OF THE DRAWINGS

FIG. 22 is a systematic view of a conventional AV server device.

DETAILED DESCRIPTION OF THE PREFERRED EMBODIMENT

Figure 1:
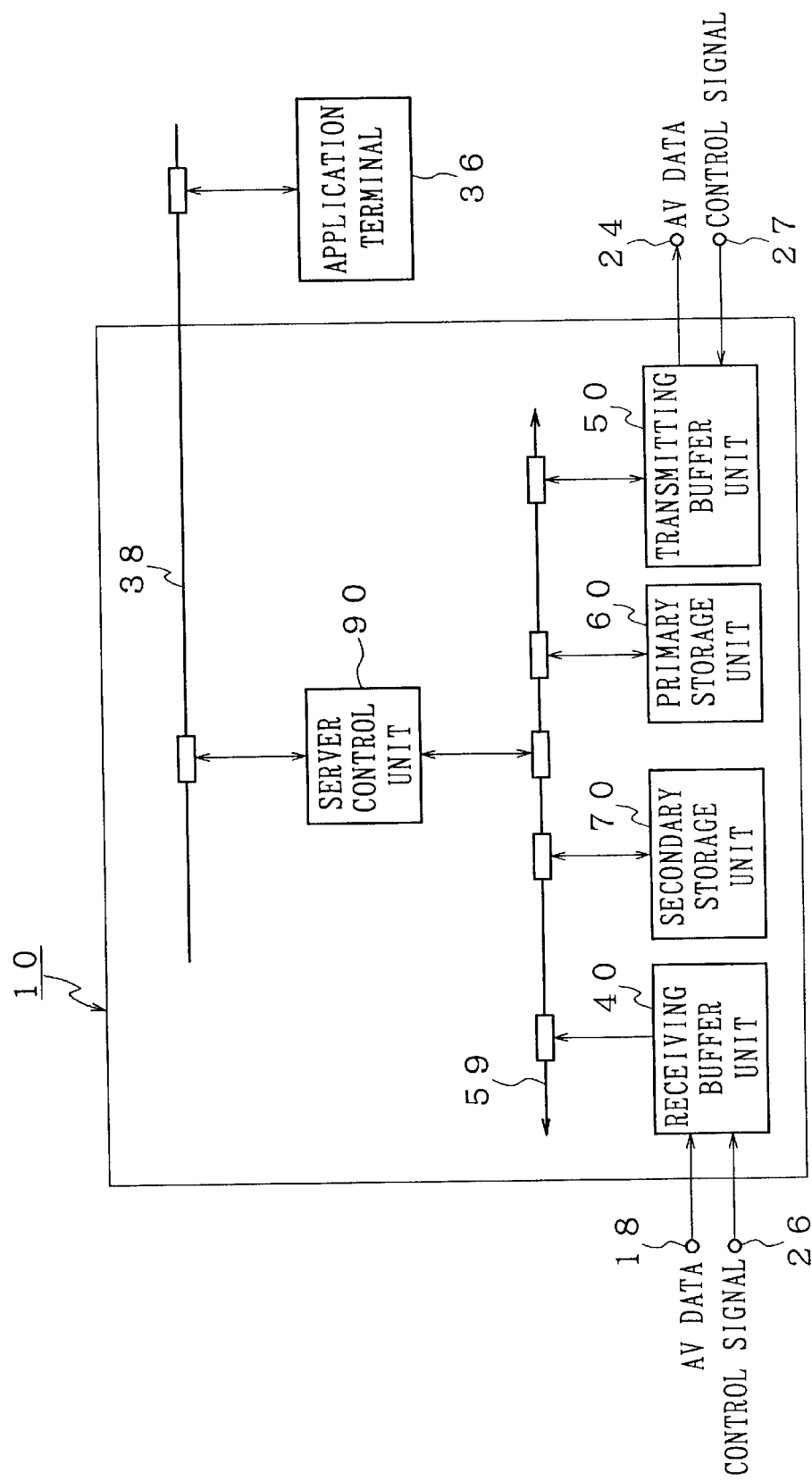
FIG. 1 is a systematic view showing essential components in an embodiment of an AV server device to which this invention is applied.

An embodiment of this invention will be specifically explained referring to the drawings where an apparatus for storing and transmitting data according to this invention is applied to an AV server device. In this invention, an AV server device is constructed on the basis of the following conception.

For example, where an AV server device for sending out commercial programs is taken into consideration, this AV server device is not in operation when an essential program is being sent out. In the prior art, AV data flow through the internal bus 16 at real time. Thus, the number of channels for simultaneous transmission depends on the transfer rate at the internal bus 16 although available efficiency of the internal bus 16 is low on an average.

Thus, the transmitting buffer unit is caused to have capacity for several files to be sent out, and it is connected to a storage device for storing a great deal of AV data (constructed as a primary storage device, a secondary storage device, and the like) through a network (subnetwork). When a semiconductor memory is used as the transmitting buffer unit, its responsivity becomes high.

On the other hand, where an amount of several files, as required, of the necessary AV data are transferred from the AV data storage means to the transmitting buffer unit, even if a disk array device is used as the storage means, real time access to the hard disk device is not required. Therefore, the responsivity of the AV server device is not deteriorated even if the hard disk device is used.

Where a transmitting buffer unit, a primary storage unit, and a secondary storage unit are respectively used as the AV data storage means, storage capacity is made smaller in this order, and thus the AV data files are made hierarchical. That is, by carrying out hierarchical control in a manner that all files in the transmitting buffer unit exist in the primary storage unit, and all files in the primary storage unit exist in the secondary storage unit, an AV server device having large capacity and high responsivity can be constructed with good cost balance.

FIG. 1 illustrates an embodiment of an AV server device 10 to which this invention is applied. This AV server device 10 is constructed by connecting parts to each other through a network, and is provided with a receiving buffer unit 40 for storing temporarily the received AV data, a transmitting buffer unit 50 for storing temporarily AV data to be transmitted, and a storage unit for AV data, particularly a primary storage unit 60 and a secondary storage unit 70 in this example. These are connected to each other through a network means 59 (which is referred to as a subnetwork).

A server control unit 90 for controlling each of these units is connected to the subnetwork 59, and in addition this server control unit 90 is connected to an application terminal 36 located upwardly in another network means 38 (an outer network (a main network)).

As described above, as the application terminal 38, a workstation, a personal computer or the like can be taken into consideration. Where AV server device 10 and the application terminal 36 are used as a commercial sending-out device, in synchronization with sending-out timing (a running schedule) signal controlled by a commercial scheduler (not shown), a control signal (a command for starting reproduction at real time) is given to a terminal 27. Thereby, the commercial contents stored in the transmitting buffer unit 50 are transmitted therefrom to that outside in synchronization with the running schedule.

The commercial contents themselves are supplied from the VTR or the like to the receiving buffer unit 40 through the terminal 18. Simultaneously, the control signal is supplied to the terminal 26 to control the receiving buffer unit 40 in such a way that the commercial contents are recorded at real time.

The following will explain structures of the respective parts.

The receiving buffer unit 40 is a unit for temporarily storing the received data at real time from the outer terminal 18 and has a capacity for several files which are handled in the AV server device 10 (for example, storage capacity corresponding to from about several minute per hour to several tens of minutes per hour). Under the control of the server control unit 90 a file (AV data) is transferred through the subnetwork 59 to the primary storage unit 60, the secondary storage unit 70 and/or the transmitting buffer unit 50 according to a standard transferring protocol.

As the standard transferring protocol, for example, the ftp (file transfer protocol) or the rcp (remote copy) on the TCP/IP Protocol (Transmission Control Protocol/Internet Protocol) can be used.

Figure 2:
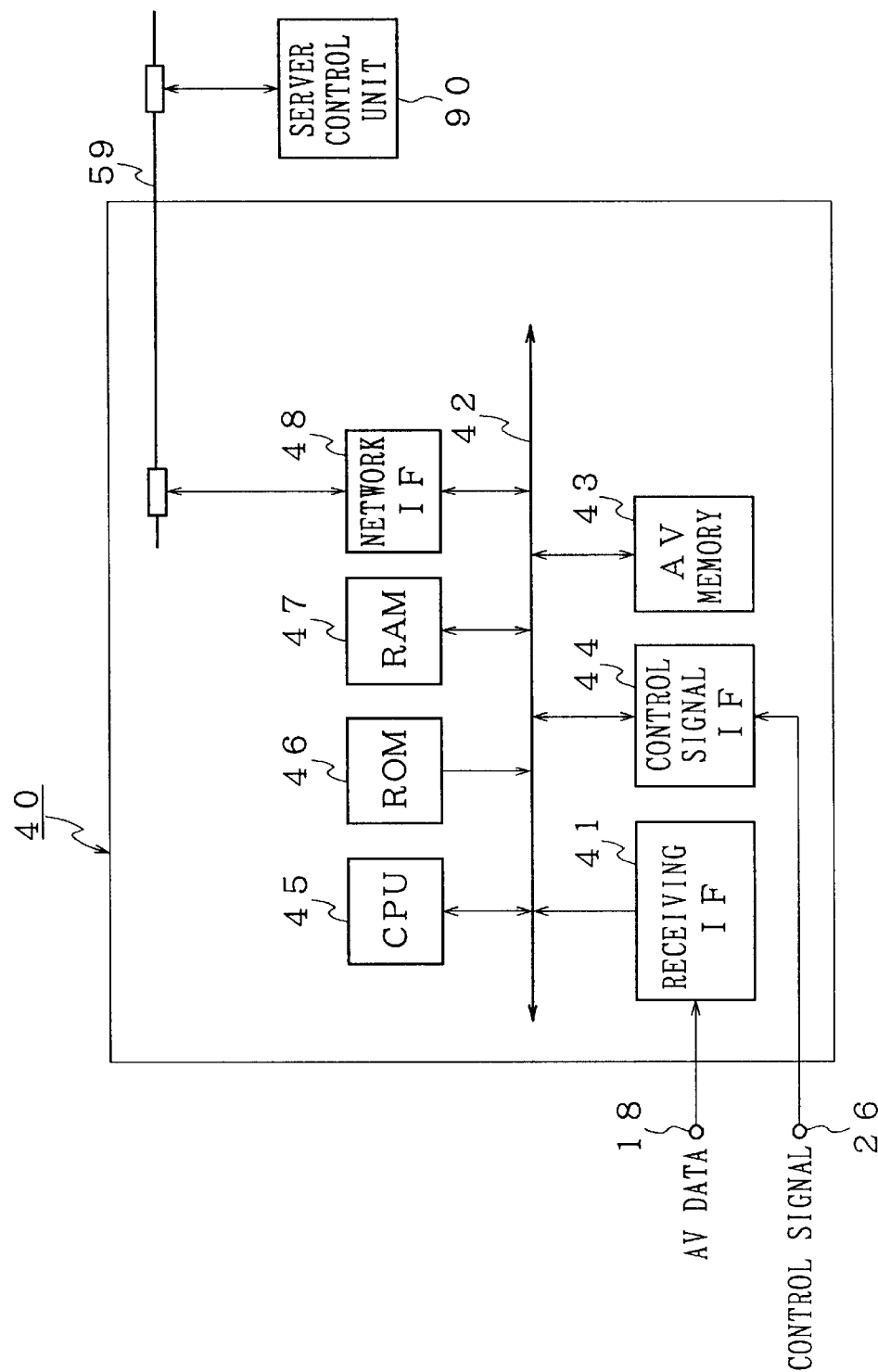
FIG. 2 is a systematic view showing essential components in an embodiment of a receiving buffer unit.

FIG. 2 shows a structure of the receiving buffer unit 40. The receiving buffer unit 40 comprises principally a receiving interface 41, an internal bus 42, an AV memory 43, a control signal interface 44, CPU 45, ROM 46, RAM 47 and a network interface 48. The internal bus 42 connects the receiving interface 41, the AV memory 43, the control signal interface 44, the CPU 45, the ROM 46, the RAM 47 and the network interface 48 to each other. The network interface 48 is also connected to the server control unit 90 through subnetwork 59.

The receiving interface 41 removes, from AV data (AV data means the data included principally an audio and/video signal, which refers to as AV data hereinafter) with a synchronizing signal received through the terminal 18, the synchronizing signal. Thus, AV data are extracted. The AV data transmitted from the receiving interface 41 are transferred to the AV memory 43 under the control of CPU 45. As the AV memory 43, for example, a semiconductor memory in which AV data may be stored in an amount of several frames, can be used. Therein, AV data transferred from the receiving interface 41 are temporarily stored. The operations for storing the AV data and for transferring the stored AV data to the secondary storage unit 70 will be explained later by using FIGS. 3 and 4.

Control signal is supplied to the control signal interface 44 through the terminal 26. Said control signal controls the operations for storing and transferring the AV data with a synchronizing signal received through the terminal 18 and for reproducing the AV data stored in the AV memory 43.

The CPU 45 carries out a control command for such the storage and transfer of AV data as well as another control command transferred from the upward of the network through the subnetwork 59.

The ROM 46 includes control programs for carrying out the above control commands.

The RAM 47 is also utilized as a working memory which stores, for example, file control information including the information on the area where a file storing AV data to be stored is actually stored in the AV memory 43, and some of the data generated when the CPU 45 is carrying out the above control commands.

The network interface 48 is used for transmitting to the subnetwork 59 the AV data, each of which is stored in the AV memory 43 and/or transferred directly from the receiving interface 41.

Figure 3:
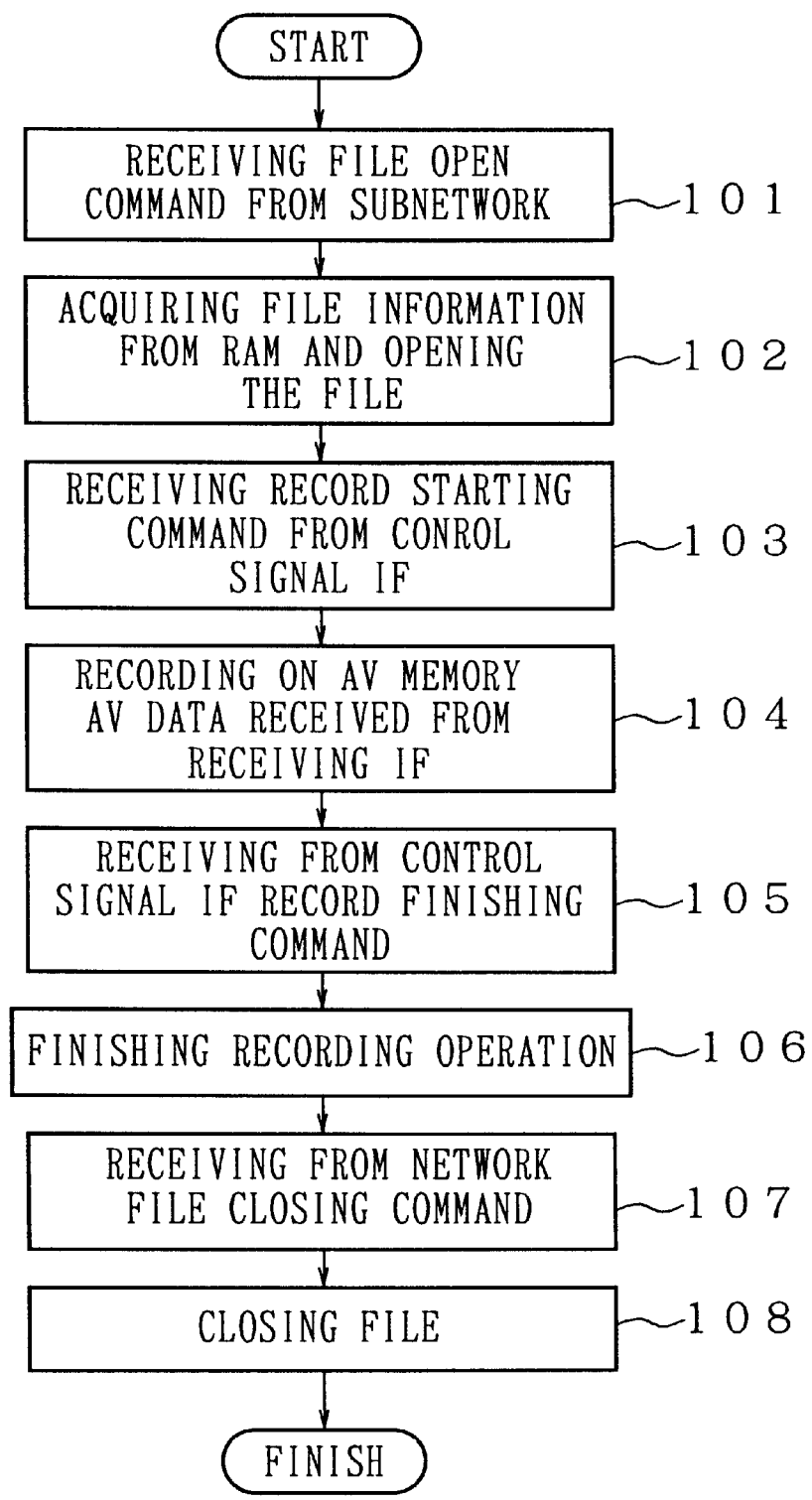
FIG. 3 is a flowchart showing an example of the recording of AV data.
Figure 4:
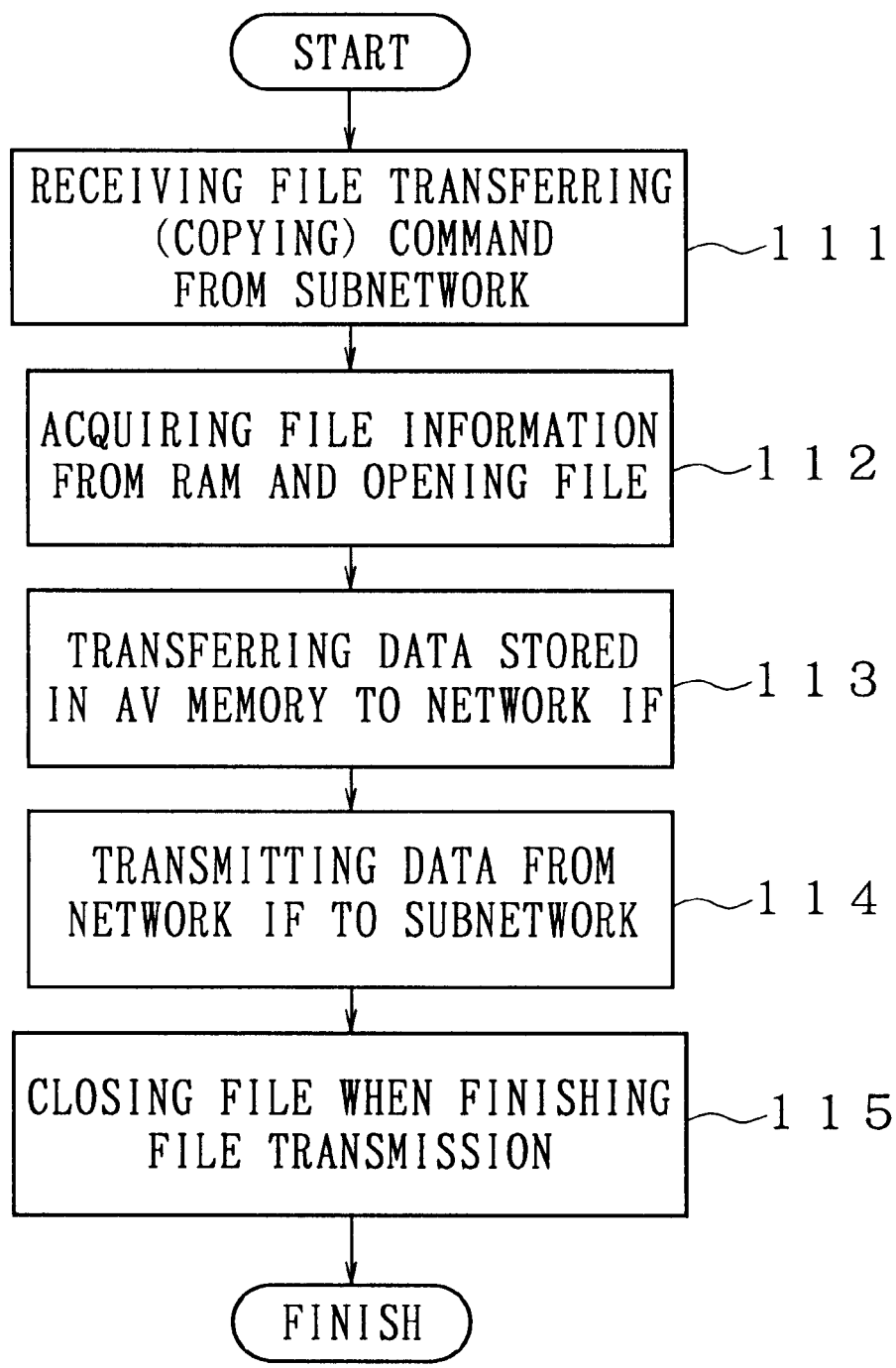
FIG. 4 is a flowchart showing an example of the transfer of files from the receiving buffer unit.

The following will explain more in detail the operations of receiving buffer unit 40 for storing the AV data and for transferring and reproducing the stored AV data by using FIGS. 3 and 4.

A file open command is firstly received from the subnetwork 59 through the network interface 48 (step 101). Said file open command is a command for allowing the file including the AV data to open and operate. In the step 101, said file open command is also used for carrying out the operation of recording the file.

Next, the CPU 45 acquires file information from the RAM 47 and opens a file (step 102). Subsequently, it waits a record starting command until said command is transferred from the upward of network through the subnetwork 59 or the control signal interface 44. The CPU 45 receivs from the control signal interface 44 the control signal including the record stating command (step 103). In the step 103, the control signal including the record starting command is transferred from the terminal 26 through the control signal interface 44 but the control signal transferred from the subnetwork 59 through the network interface 48 may be also used therein. After receiving the control signal including the record starting command, the CPU 45 controls the receiving interface 41, the AV memory 43 and the internal bus 42 so that the AV data is received through the receiving interface 41 and recorded on the AV memory 43 through the internal bus 42 (step 104). This recording mode continues to be carried out until the control signal including a record finishing command is received. Said record finishing command orders the finish of the recording operation.

When the record of the required AV data is finished the CPU 45 receives the control signal including the record finishing command through the control signal interface 44 (step 105). The control signal transferred from the subnetwork 59 through the network interface 48 may be also used therein as is the above case.

When the CPU 45 receives the control signal including the record finishing command the CPU 45 finishes the recording operation of the AV data on the AV memory 43 (step 106). When a file closing command is received from the upward of network through the subnetwork 59 and the network interface 48 (step 107), the operation for control the file including the AV data stored in the AV memory 43 is closed (step 108). Thereby, the recording operation of the receiving buffer unit 40 for recording the received AV data on the AV memory 43 is finished.

The following explains more in detail the transfer operations of receiving buffer unit 40 for transferring the AV data by using FIG. 4.

When the transfer operation of the receiving buffer unit 40 for transferring the AV data is started the CPU 45 receives firstly the control signal including a file transferring command from the upward of network through the subnetwork 59 and the network interface 48. Said file transferring command orders copying the file, and transferring and transmitting the copied file (step 111). Further, said command is illustratively issued from server control unit 90 and transferred to the receiving buffer unit 40 through the subnetwork 59. Of course, said command may be issued from the application terminal 36 located on the upward of network.

When the CPU 45 receives the control signal including this file transferring command to copy the file, file information is acquired from the RAM 47 to open the file to be transferred (step 112).

Subsequently, the data stored in the AV memory 43 are transferred to the network interface 48 through the internal bus 42 (step 113).

The network interface 48 transmits the transferred AV data to the subnetwork 59 (step 114). The AV data transmitted from network interface 48 are transferred through the subnetwork 59 to the secondary storage unit 70, the primary storage unit 60 and the transmitting buffer unit 50 each of which will be explained later. When the transmission of all required files is finished, the CPU 45 closes the files to finish the operations of files (step 115) and the file transferring and transmitting process is finished.

Next, the following explains more in detail the structure and operations of transmitting buffer unit 50.

Figure 5:
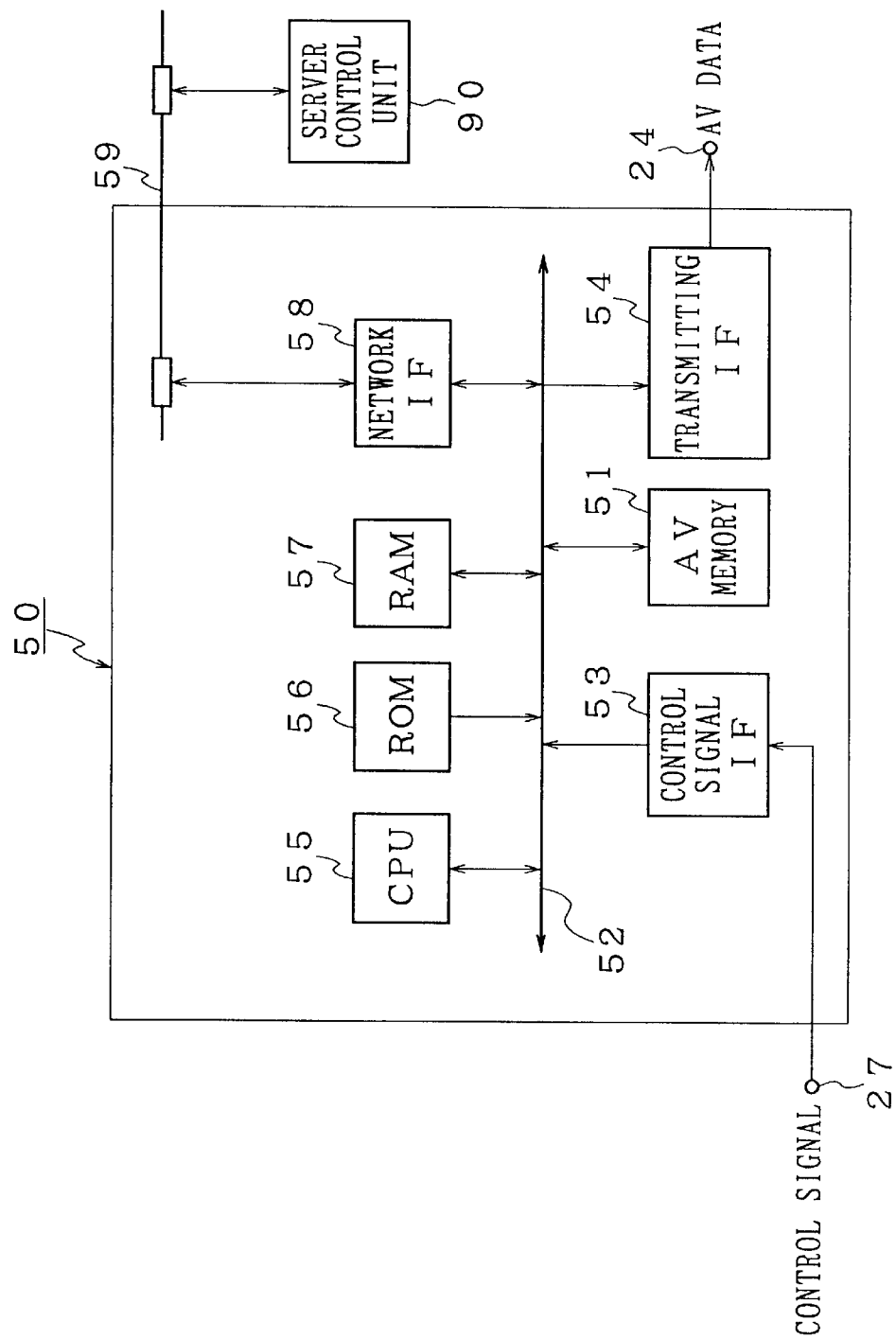
FIG. 5 is a systematic view showing essential components in an embodiment of a transmitting buffer unit.

The structure of the transmitting buffer unit 50 will be explained by using FIG. 5.

The transmitting buffer unit 50 comprises principally an AV memory 51, an internal bus 52, a control signal interface 53, a transmitting interface 54, CPU 55, ROM 56, RAM 57 and a network interface 58. The internal bus 52 connects the AV memory 51, the control signal interface 53, the transmitting interface 54, the CPU 55, the ROM 56, the RAM 57 and the network interface 58 to each other. The network interface 58 is also connected to the server control unit 90 through subnetwork 59.

As the AV memory 51, for example, a semiconductor memory can be used, and it has a storage capacity for storing the order of an amount of several frames of AV data, namely, the order corresponding to several minutes to several tens of minute, as converted into time.

The operations for transmitting and recording the AV data into said AV memory 51 will be explained later more in detail by using FIGS. 6 and 7.

Control signal interface 53 is used for receiving the control signal supplied through the terminal 27 and for transferring the received control signal to the CPU 55 or the like through the internal bus 52.

The transmitting interface 54 is used for transmitting to outside through the terminal 24 the AV data transferred via the internal bus 52. The transmitting interface 54 adds the synchronizing signal to the transferred AV data and transmits the synchronizing signal added AV data outside. The transmitting interface 54 may expand the AV data, as occasion requires, to bring the AV data back to base band signal and transmits the same outside.

The CPU 55 carries out some of the controls under a control signal including control commands such as the one for recording and reproducing the data transferred through the control signal interface 53 or the subnetwork 59 and the network interface 58.

The ROM 56 includes control programs to operate the CPU 55 and the CPU 55 carries out the above controls under the control program.

The RAM 57 is also utilized as a working memory which stores, for example, data control information including the information on the area where an AV data to be stored is actually stored in the AV memory 51, and some of the data generated when the CPU 55 is carrying out the above controls.

The network interface 58 is used for converting the control commands and the AV data, each of which is transferred through the subnetwork 59, into the data having the format available in the transmitting buffer unit 50.

Figure 6:
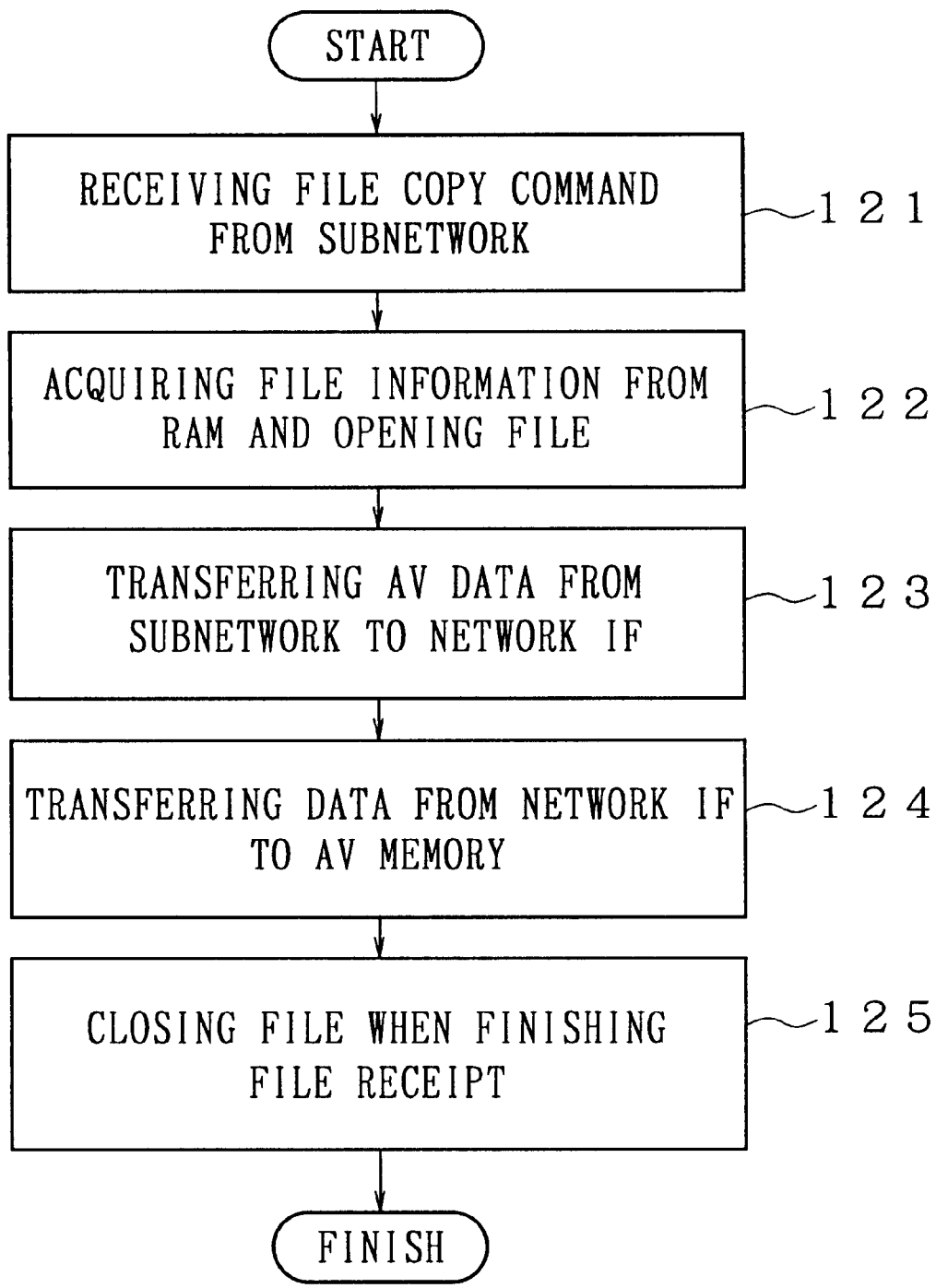
FIG. 6 is a flowchart showing an example of the transmission of files in the transmitting buffer unit.
Figure 7:
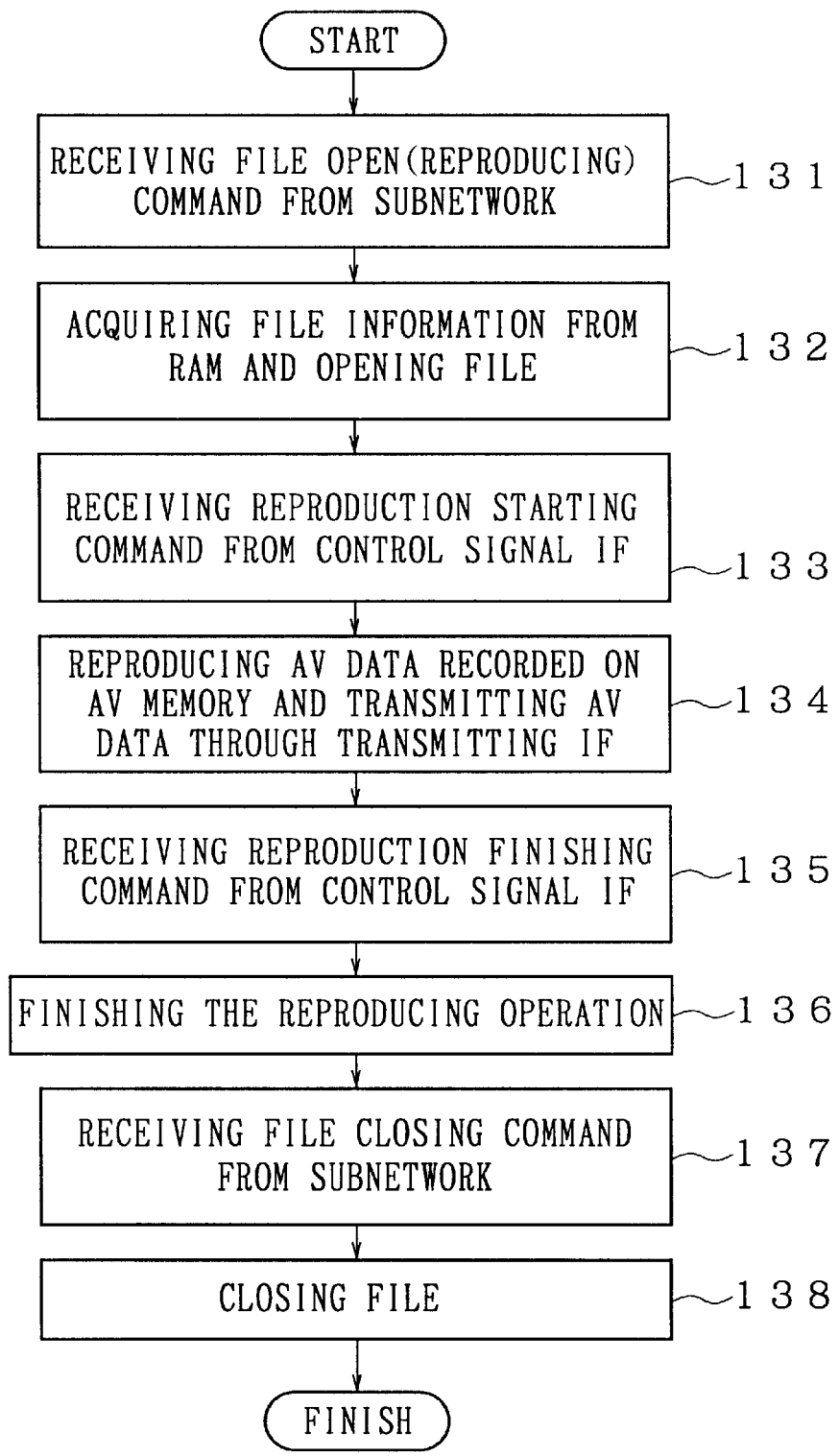
FIG. 7 is a flowchart showing an example of the reproduction of AV data in the transmitting buffer unit.

The following will explain more in detail the operations of transmitting buffer unit 50 by using FIGS. 6 and 7.

Referring to FIG. 6, the operation to record (or transfer) the AV data to the transmitting buffer unit 50 is explained more in detail as follows:

When the record process of the file storing the AV data starts, a file copy command is firstly received from the subnetwork 59 through the network interface 58 (step 121);

Next, when the CPU 55 receives the file copy command, the CPU 55 acquires file information from the RAM 57 to open the file to be copied (step 122);

The network interface 58 receives the AV data transferred from the subnetwork 59 (step 123);

The CPU 55 transfers the AV data transferred to the network interface 58 to the AV memory 51 through the internal bus 52 and records said AV data on the AV memory 51 (step 124); and When the record of all files to be recorded on the AV memory 51 is finished, the CPU 55 closes the files to finish the operations of files (step 125) and the file recording (transferring) process is finished.

Further, Referring to FIG. 7, the transmitting operation of the transmitting buffer unit 50 for transmitting the AV data is explained more in detail as follows:

To transmit the AV data recorded in the AV memory 51 to the outside, when the reproducing process of the AV data as shown in FIG. 7 starts, the CPU 55 receives the file open command that instructs the start of operation of the file to be transmitted, which is transferred from the subnetwork 59 through the network interface 58 (step 131);

The CPU 55 acquires file information from the RAM 57 and waits a next command (step 132);

The CPU 55 receives the reproduction starting command that instructs the start of the reproduction of the AV data recorded on the AV memory 51, from the terminal 27 through the control signal interface 53 (step 133);

When the CPU 55 receives the reproduction starting command, the CPU 55 starts reproducing the AV data recorded on the AV memory 51 and transmits the reproduced AV data to the transmitting interface 54 (step 134);

When the CPU 55 receives a reproduction finishing command from the control signal interface 53 (step 135), it finishes the reproducing operation (step 136);

Further, the CPU 55 receives the file closing command that instructs the finish of file operation, from the subnetwork 59 through the network interface 58 (step 137); and The CPU 45 closes the desired file to finish the file operation (step 138) and the transmitting process of the transmitting buffer unit 50 is finished.

Next, the following will explain more in detail the structure and operation of the primary storage unit 60.

Figure 8:
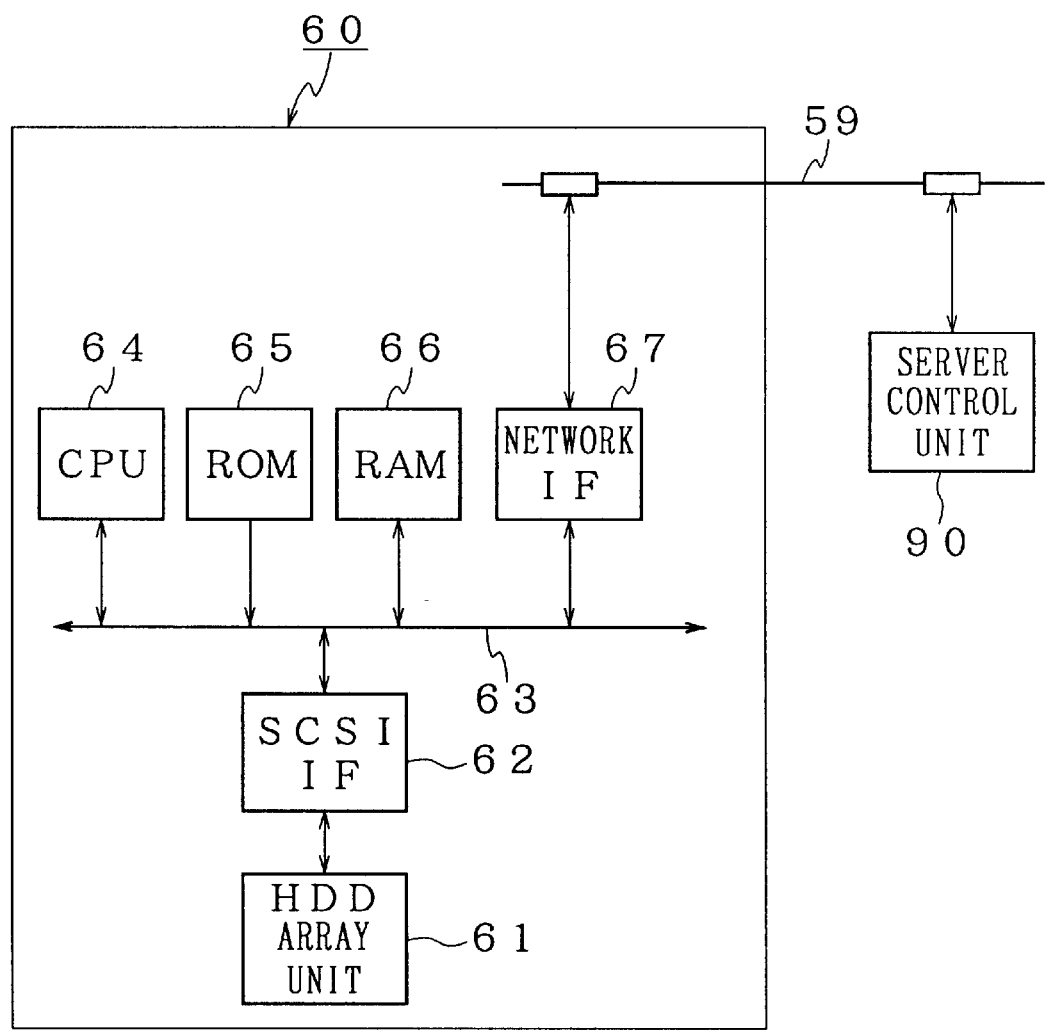
FIG. 8 is a systematic view showing essential components in an embodiment of a primary storage unit.

FIG. 8 shows essential components of a primary storage unit for storing AV data, and the primary storage unit 60 comprises principally disk array unit 61, a SCSI interface 62, an internal bus 63, CPU 64, ROM 65, RAM 66 and a network interface 67.

The disk array unit 61 is composed of a plurality of hard disk drives, wherein said hard disk drives are arranged as a RAID (Redundant Arrays of Inexpensive Disks). For example, examples of the RAID are a RAID-1, a RAID-3 and a RAID-5. The RAID-1 configures the hard disk drives so that the same AV data are written to two hard disk drives. The RAID-3 configures the hard disk drives so that the received AV data are divided into a set length of the data and the divided AV data are written to a plurality of hard disks as well as parity data that are an exclusive OR of the data block corresponding to each hard disk drives, are produced and the produced parity data are written to another hard disk. The RAID-5 configures the hard disk drives so that the received AV data are divided into a large block unit and each divided data are written to one hard disk as well as parity data that are an exclusive OR of the data block corresponding to each hard disk drives, are recorded to another hard disk as the parity block, and said parity block is distributed and written to still another hard disk. However, when the present invention is carried out, it has not a dependence on such a RAID arrangement.

The SCSI interface 62 interfaces between the disk array unit 61 and an internal bus 63.

The internal bus 63 is a bus for transferring the data in the primary storage unit 60 and connects the SCSI interface 62, the CPU 64, the ROM 65, the RAM 66 and the network interface 67 to each other.

The CPU 64 controls various operations of the whole of the primary storage unit 60, for example, the operation for recording on disk array unit 61 the AV data transferred through the subnetwork 59, and the operations for reproducing the AV data recorded on the disk array unit 61 and for transmitting the AV data to the outside.

The ROM 65 includes control programs to operate the CPU 64 and the CPU 64 carries out the above controls under the control program.

The RAM 66 is also utilized as a working memory which stores, for example, data control information (file system) including the information on the area where an AV data to be stored is actually stored in the disk array unit 61, and some of the data generated when the CPU 64 is carrying out the above controls.

The network interface 67 interfaces between the primary storage unit 60 and the subnetwork 59, receives the AV data transferred from the outside through the subnetwork 59 and transmits the AV data from the primary storage unit 60 to the subnetwork 59.

The operations of said primary storage unit 60 will be explained more in detail by using FIGS. 9 and 10.

Figure 9:
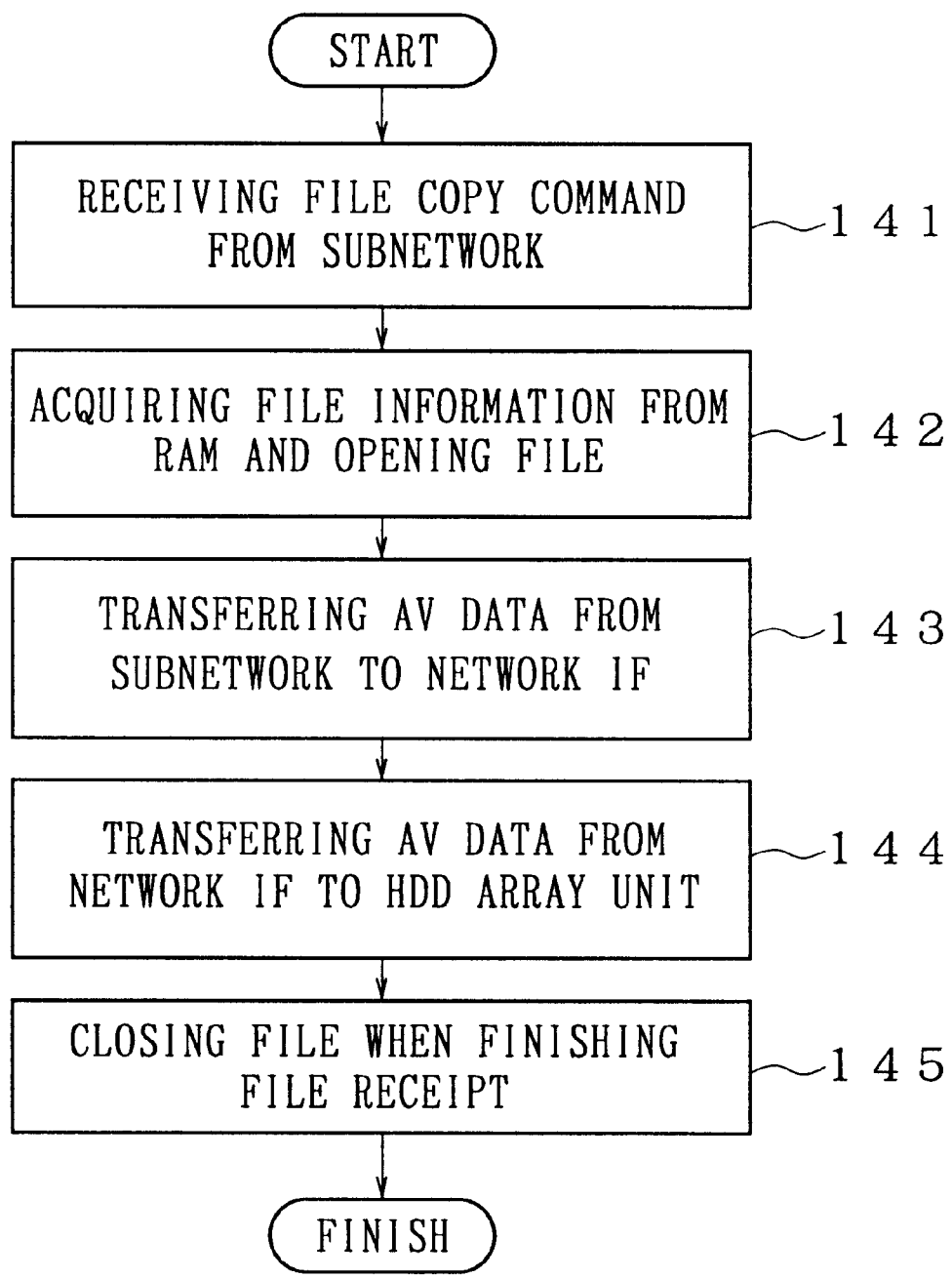
FIG. 9 is a flowchart of an example of the transfer of files in the primary storage unit when it receives the files.

Referring to FIG. 9, such the operation of said primary storage unit 60 that the AV data are transferred through the subnetwork and recorded into the disk array unit 61, is explained more in detail as follows:

When the transferring process of the AV data starts, the CPU 64 waits until the file copy command is received through the subnetwork 59 and the network interface 67 (step 141) said file copy command instructs copying the file including the AV data, in other words, receiving the file.

When the CPU 64 receives the file copy command, it acquires the file information from the RAM 66 and starts opening the file (file open) to operate the same (step 142) and then the CPU 64 waits until the AV data are actually transferred after the ready for the file copy;

When the CPU 64 waits for the AV data transferred to the network interface 67 through the subnetwork 59 and the AV data are actually transferred (step 143), the CPU 64 controls the network interface 67 so that it makes the received AV data transferred to the disk array unit 61 trough the internal bus 63 (step 144);

The transferred AV data are actually received in the disk array unit 61 through SCSI interface 62 and recorded therein; and When said transferring operation is finished, the CPU 64 finishes the operation of the file to be transferred (closing the file) (step 145).

Figure 10:
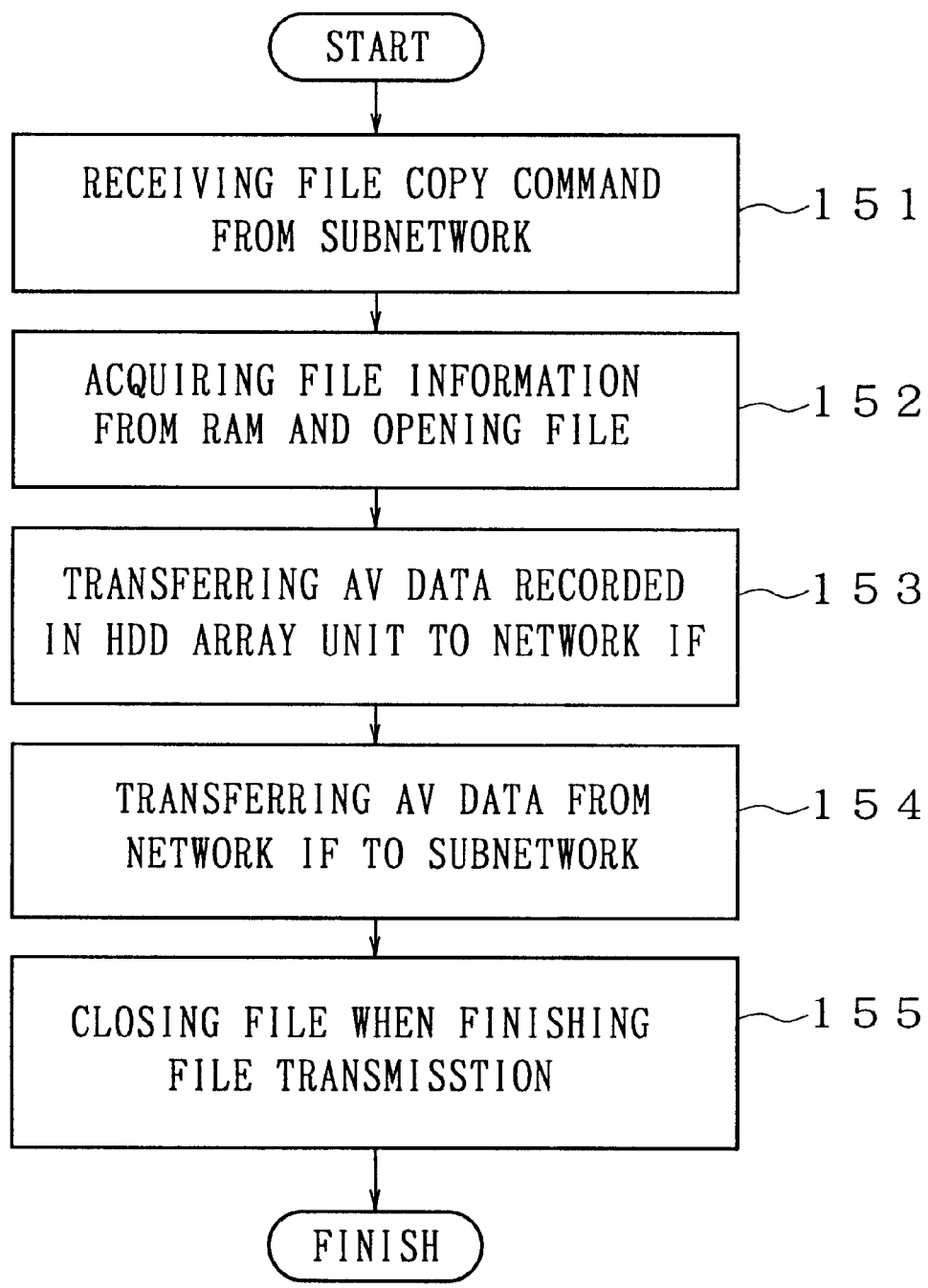
FIG. 10 is a flowchart of an example of the transfer of files in the primary storage unit when it transfers the files.

Referring to FIG. 10, such the operation of said primary storage unit 60 that the AV data recorded in the disk array unit 61 are transmitted to the outside, is explained more in detail as follows:

When the transferring process of the AV data (file transfer process) starts, the CPU 64 receives from the subnetwork 59 the file copy command, namely, the command that instructs the transmission the AV data recorded in disk array unit 61 to outside (step 151);

The CPU 64 acquires the file information, namely, the information on the area where the file to be transferred is recorded, from the RAM 66 and transfers to the disk array unit 61 some of the commands such as an access allowing command, a reproducing command or the like (step 152);

Disk array unit 61 reproduces the file to be reproduced or the AV data to be reproduced under the reproducing command and transfers them to the SCSI interface 62 (step 153);

The CPU 64 controls the network interface 67 so that the AV data transferred to SCSI interface 62 are transferred to the network interface 67 through the internal bus 63 (step 154);

The transferred AV data to be transmitted outside are transmitted through the subnetwork 59 to the units which are located outside, for example, the receiving buffer unit 40, transmitting buffer unit 50, the secondary storage unit 70, as shown in FIG. 1; and When said transferring operation of file is finished, the CPU 64 finishes the operation of the file (closing the file) (step 155).

Figure 11:
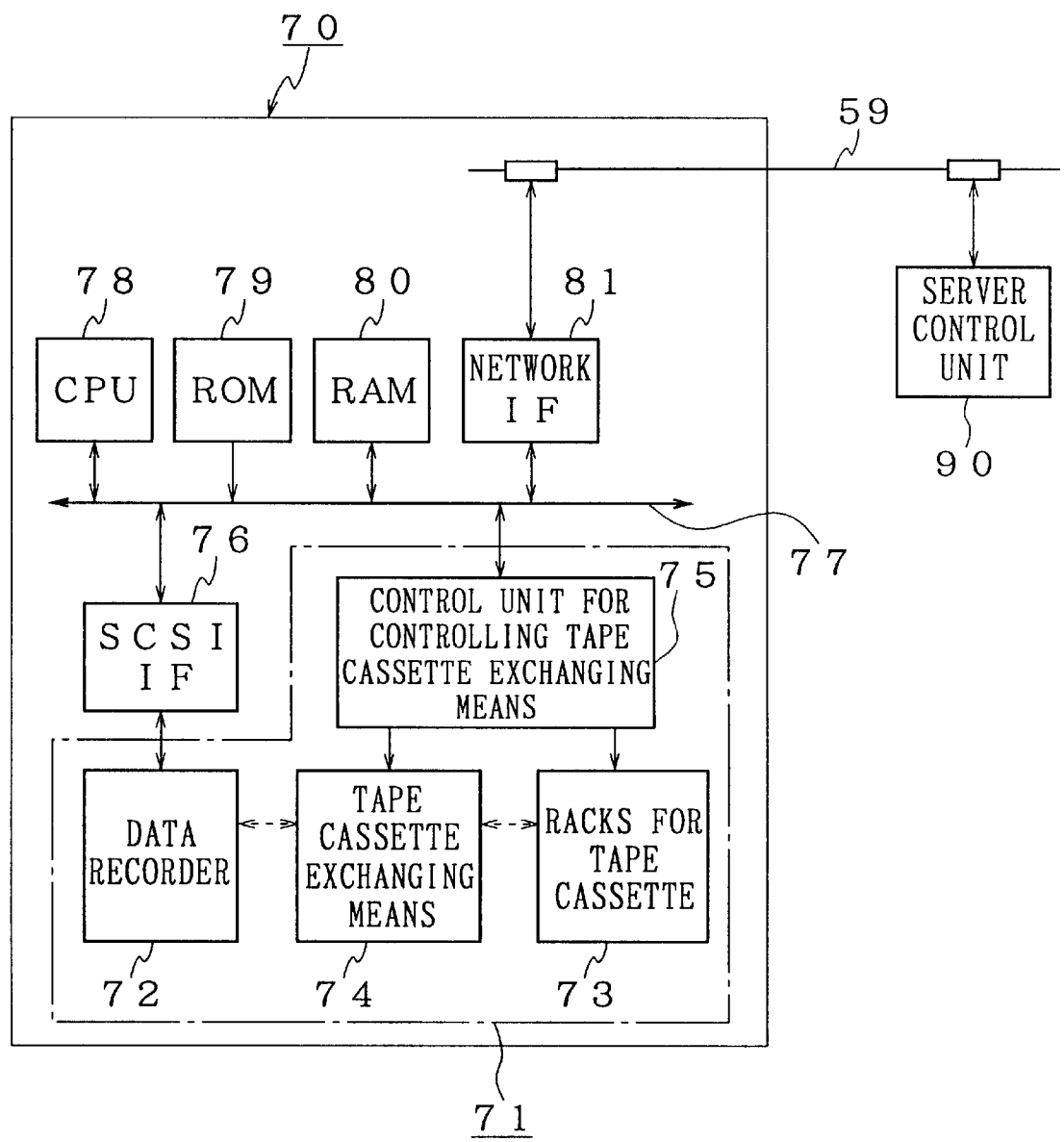
FIG. 11 is a systematic view showing essential components in an embodiment of a secondary storage unit.
Figure 12:
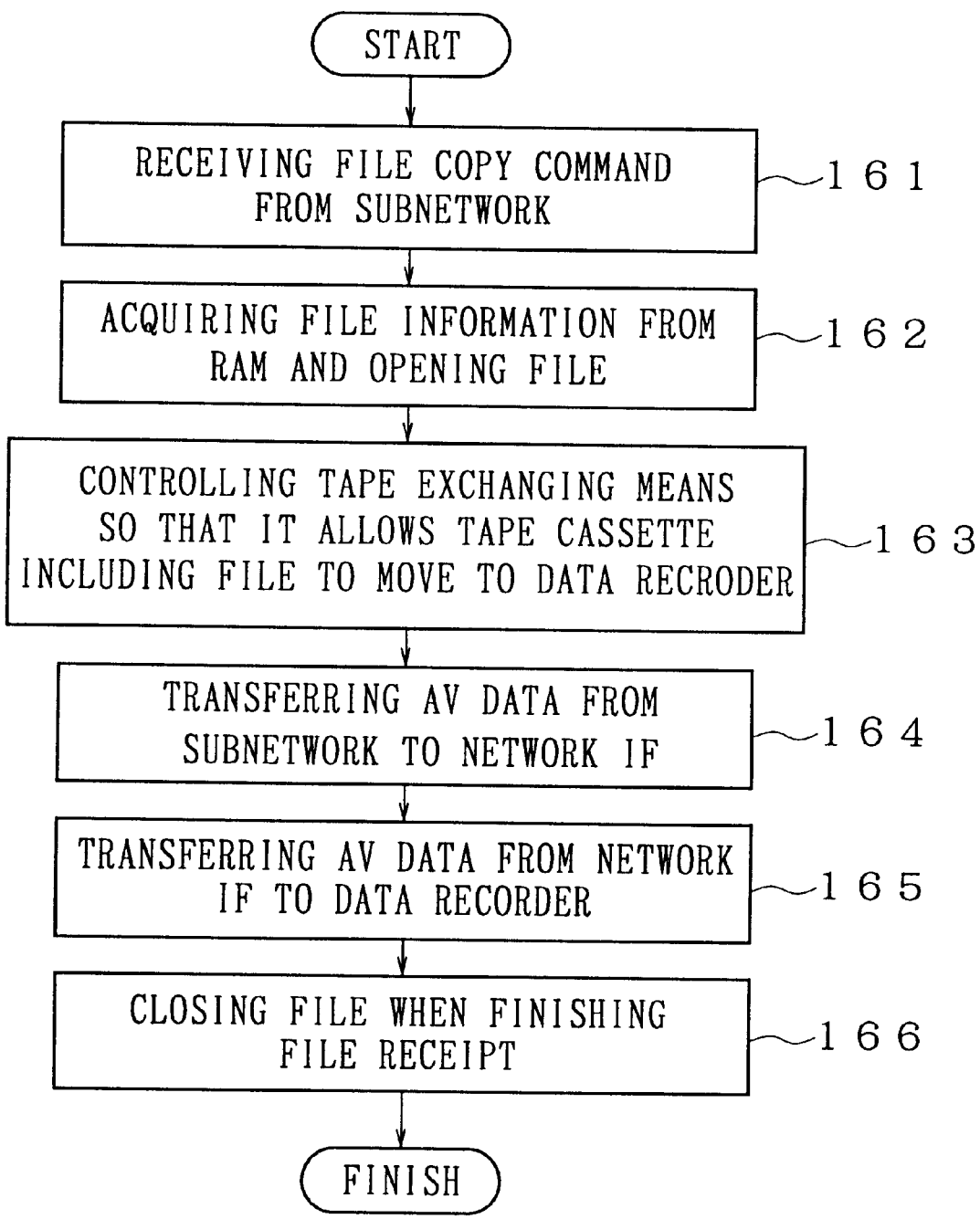
FIG. 12 is a flowchart of an example of the transfer of files in the secondary storage unit when it receives the files.
Figure 13:
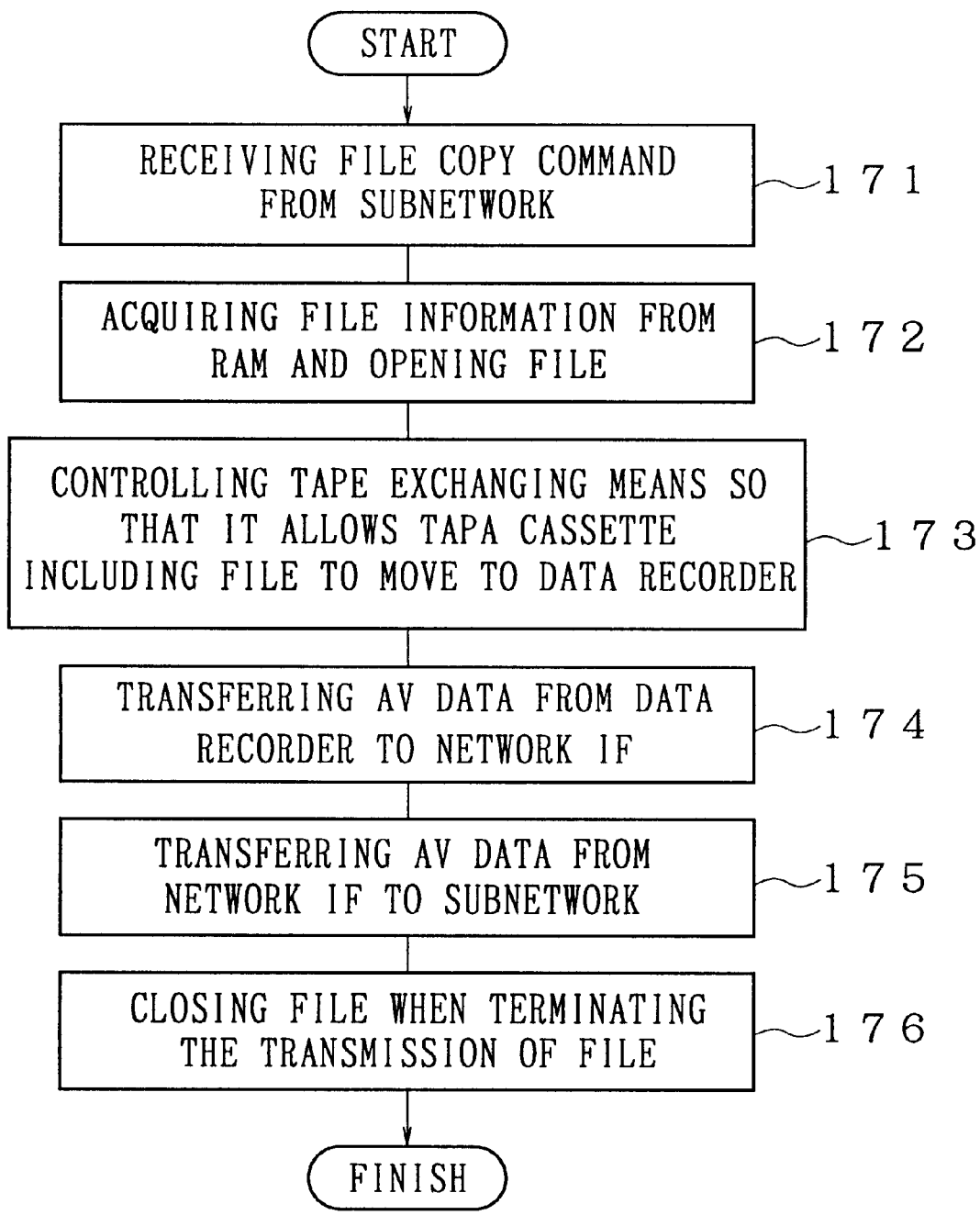
FIG. 13 is a flowchart of an example of the transfer of files in the secondary storage unit when it transfers the files.

Next, the following will explain more in detail the structure and operation of the secondary storage unit 70 by using FIGS. 11, 12 and 13.

The storage capacity of the secondary storage unit 70 is larger than that of the primary storage unit 60. The storage capacity of the primary capacity is larger than that of the transmitting buffer unit 50. Therefore, when the file is transferred among the secondary storage unit 70, the primary storage unit 60 and the transmitting buffer unit 50, all the files to be stored in the transmitting buffer unit 50 are stored in the primary storage unit 60. Further, all the files to be stored in the primary storage unit 60 are stored in the secondary storage unit 70.

Although the primary storage unit 60 uses a randomly accessible recording medium such as a hard disk, the secondary storage unit 70 uses magnetic tapes because the storage capacity of a hard disk etc. is too small to record the data required by the secondary storage unit 70. Therefore, all the files are stored in the secondary storage unit 70.

The files to be transmitted are stored once in the secondary storage unit 70 and then transferred the primary storage unit 60 composed of the randomly accessible recording medium. In the primary storage unit 60, the operations for performing the editing of the files are illustratively carried out, and the performed files are transferred to the transmitting buffer unit 50. Since the transmitting buffer unit 50 is a recording medium such as the semiconductor memory, the files to be transmitted may be transmitted to the outside at the transmission time with precision.

Referring to FIG. 11, the following will explain more in detail the structure of the secondary storage unit 70.

Secondary storage unit 70 comprises principally an auto changer 71 for a tape cassette, a SCSI interface 76, an internal bus 77, CPU 78, ROM 79, RAM 80 and a network interface 81.

The auto changer 71 stores a plurality of the tape cassette for making its recording capacity larger and is composed of a data recorder 72, racks 73 for the tape cassette, a tape cassette exchanging means 74 and a control means 75 for controlling the tape cassette exchanging means. The data recorder 72 is a recording and reproducing unit for recording the data on the tape cassette and for reproducing the data recorded on the tape cassette. The racks 73 are used for storing the tape cassette to be used by data recorder 72 and composed of a plurality of rack to store many tape cassettes. The tape cassette exchanging means 74 is a carrying apparatus for selecting a tape cassette or tape cassettes out of the tape cassettes stored in the racks 73 and carrying the same to the data recorder 72 and for selecting a tape cassette or tape cassettes out of the tape cassettes used in the data recorder 72 and carrying the same back to the racks 73.

The control means 75 controls the operation of the tape cassette exchanging means 74. For example, it controls the tape cassette exchanging means 74 so that the tape cassette is selected a specific data recorder 72 out of the data recorders and carried to a specific rack 73 out of the racks. It may control the exchanging means 74 so that a tape cassette is drawn out from the racks 73 and carried to a data recorder 72. The operation of the tape cassette exchanging means 74 is controlled by the control command issued by the application terminal located in the upward of network. The operation may also be controlled by the control command issued the control terminal (not shown) connected directly with the control means 75.

The SCSI interface 76 interfaces between the data recorder 72 and the internal bus 77. The SCSI interface 76 converts the format of the data transmitted from the data recorder 72, into that of the internal bus 77 and/or the format of the data transferred from the internal bus 77, into that of the data which the data recorder 77 is capable to record.

The CPU 78 controls various operations of the secondary storage unit 70, for example, the operation for recording the AV data under the control command transferred through the network interface 81, and the operations for reproducing the AV data.

The ROM 79 includes control programs to operate the CPU 78 and the CPU 78 carries out the above controls under the control program.

The RAM 80 is also utilized as a working memory which stores, for example, data control information recorded in the tape cassette of the auto changer 71, and some of the data generated when the CPU 78 is carrying out the above controls.

The network interface 81 converts the format of the control command and data transferred through the subnetwork 59 into that of the data which the secondary storage unit 70 is capable to utilize and/or the format of the data utilized in the secondary storage unit 70 into that of the data which may be transferred to the subnetwork 59.

Next, the operations of the secondary storage unit 70 will be explained more in detail by using FIGS. 12 and 13.

FIG. 12 is a flowchart showing a process for recording on the secondary storage unit 70 the AV data transferred through the subnetwork 59.

When the recording process starts in the secondary storage unit 70, the CPU 78 receives from the subnetwork 59 through the network interface 81 the recording command (file copy command) that instructs the CPU 78 to record on the secondary storage unit 70 the file including the AV data (step 161).

Next, the CPU 78 acquires the file information from the RAM 80 and starts the operation of the acquired file (opening the file) (step 162).

The CPU 78 controls the control means 75 so that said control means finds out the tape cassette including the file to be reproduced from the file information. The control means 75 controls the tape cassette exchanging means 74 so that the exchanging means allows said tape cassette to move from the racks 73 to the data recorder 72 (step 163).

After moving the tape cassette to the data recorder 72, the AV data are transferred to the network interface 81 through the internal bus 77 (step 164) and then the transferred AV data are transferred to the data recorder 72 through the internal bus 77 and the SCSI interface 76 and recorded by the data recorder 72 (step 165).

When the data recorder 72 finishes the record of the AV data on the tape cassette, after terminating the receipt of the necessary file, the CPU 78 finishes the operation of the file (closing the file) (step 166). Thereby, the recording process is finished.

FIG. 13 is a flowchart showing a file transmitting process for reproducing the file recorded in the tape cassette stored in the rack 73 by the data recorder 72 and for transmitting the reproduced file to the outside.

When the file transmitting process starts, the CPU 78 receives from the subnetwork 59 through the network interface 81 the file transmitting command (file copy command) that instructs the transmission of the file including the AV data from the secondary storage unit 70 to the outside (step 171).

Next, the CPU 78 acquires the file information from the RAM 80 and starts the operation of the acquired file (opening the file) (step 172).

The CPU 78 controls the control means 75 so that said control means finds out the tape cassette including the file to be reproduced from the file information. The control means 75 controls the tape cassette exchanging means 74 so that the exchanging means allows said tape cassette to move from the racks 73 to the data recorder 72 (step 173).

After moving the tape cassette to the data recorder 72, the file including the AV data is reproduced by the data recorder 72 and the reproduced file is transferred to the network interface 81 through the SCSI interface 76 and the internal bus 77 (step 174).

The network interface 81 transmits the transferred file to the subnetwork 59 (step 175) and the CPU 78 finishes the operation of the file (step 176). Thereby, the file transmitting process is finished.

Figure 14:
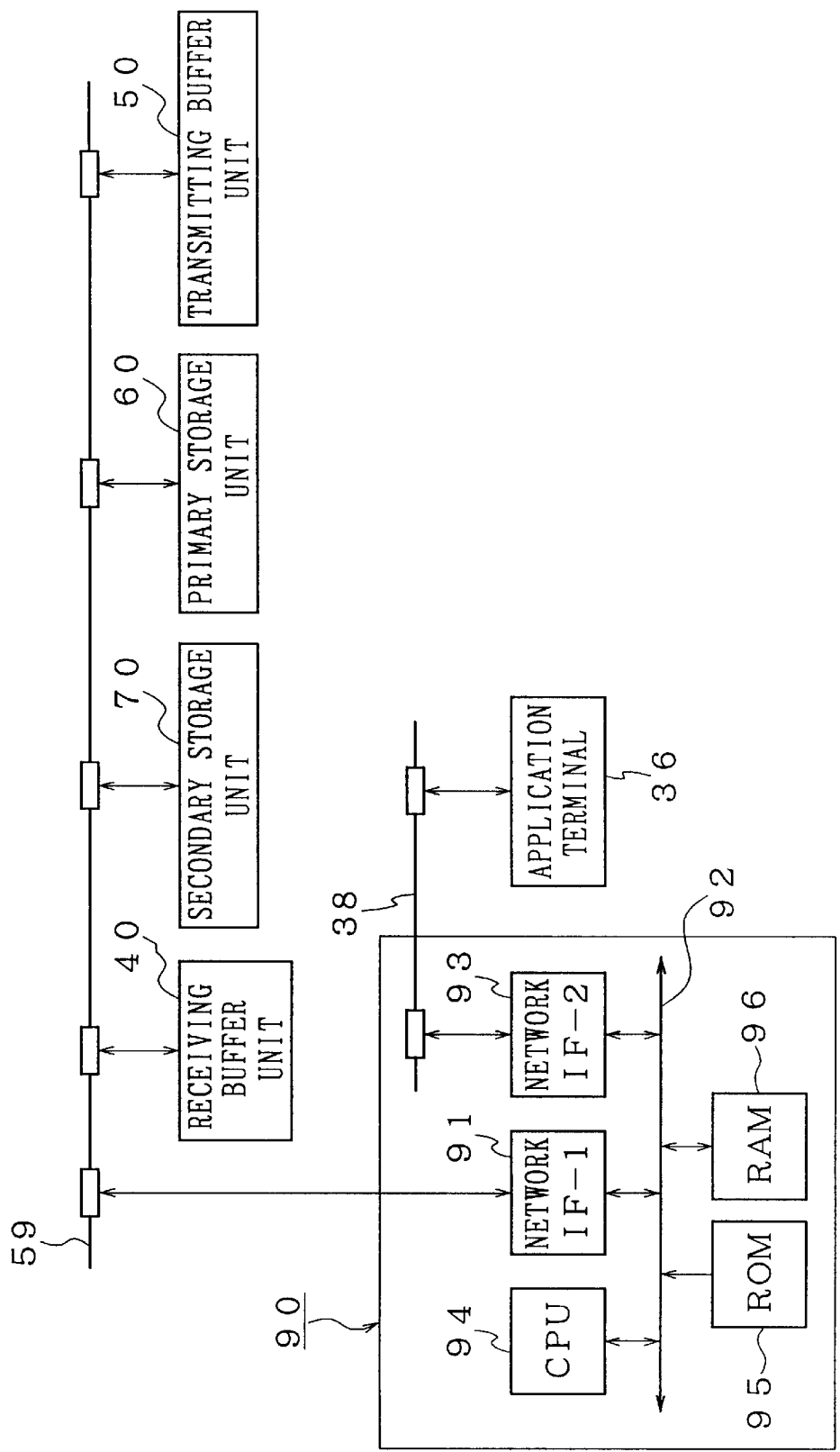
FIG. 14 is a systematic view showing essential components in an embodiment of a server control unit.

Next, the structure and operation of the server control unit 90 will be explained more in detail by using FIGS. 14, 15 and 16.

The server control unit 90 is used for controlling the transfer of the file between the receiving buffer unit 40, the primary storage unit 60, the secondary storage unit 70 and the transmitting buffer unit 50, and for controlling the record of AV data in the receiving buffer unit 40 and the reproduce of AV data in the transmitting buffer unit 50 or the like. In other words, the server control unit 90 is an apparatus for controlling the record, transfer and reproduction etc. of the file including the AV data with reference to the whole of the AV server system 10.

The server control unit 90 comprises principally a first network interface 91, a second network interface 93, CPU 94, ROM 95 and RAM 96.

The subnetwork 59 linking the receiving buffer unit 40, the primary storage unit 60, the secondary storage unit 70 and the transmitting buffer unit 50 to each other and a network 38 linking the application terminal must be different from each other to prevent their congestion. Therefore, the server control unit 90 has two network interfaces, each of which corresponds to each of the subnetwork 59 and the network 38. The first network interface 91 interfaces between the subnetwork 59 connected with the above units and the internal bus 92 of the server control unit 90. The second network interface 93 interfaces between the internal bus 92 of the server control unit 90 and the network 38 connected to the application terminal 36.

The CPU 94 carries out illustratively control commands transferred through each of the network 38 and the subnetwork 59, and a control command received from the receiving means, not shown, connected with the server control unit 90.

The ROM 95 includes control programs for carrying out the above control commands by the CPU 94.

The RAM 96 includes the file information of the receiving buffer unit 40, the primary storage unit 60, the secondary storage unit 70 and the transmitting buffer unit 50. The server control unit 90 may check what sorts of files are stored in the each of the above units by using such the file information.

Figure 15:
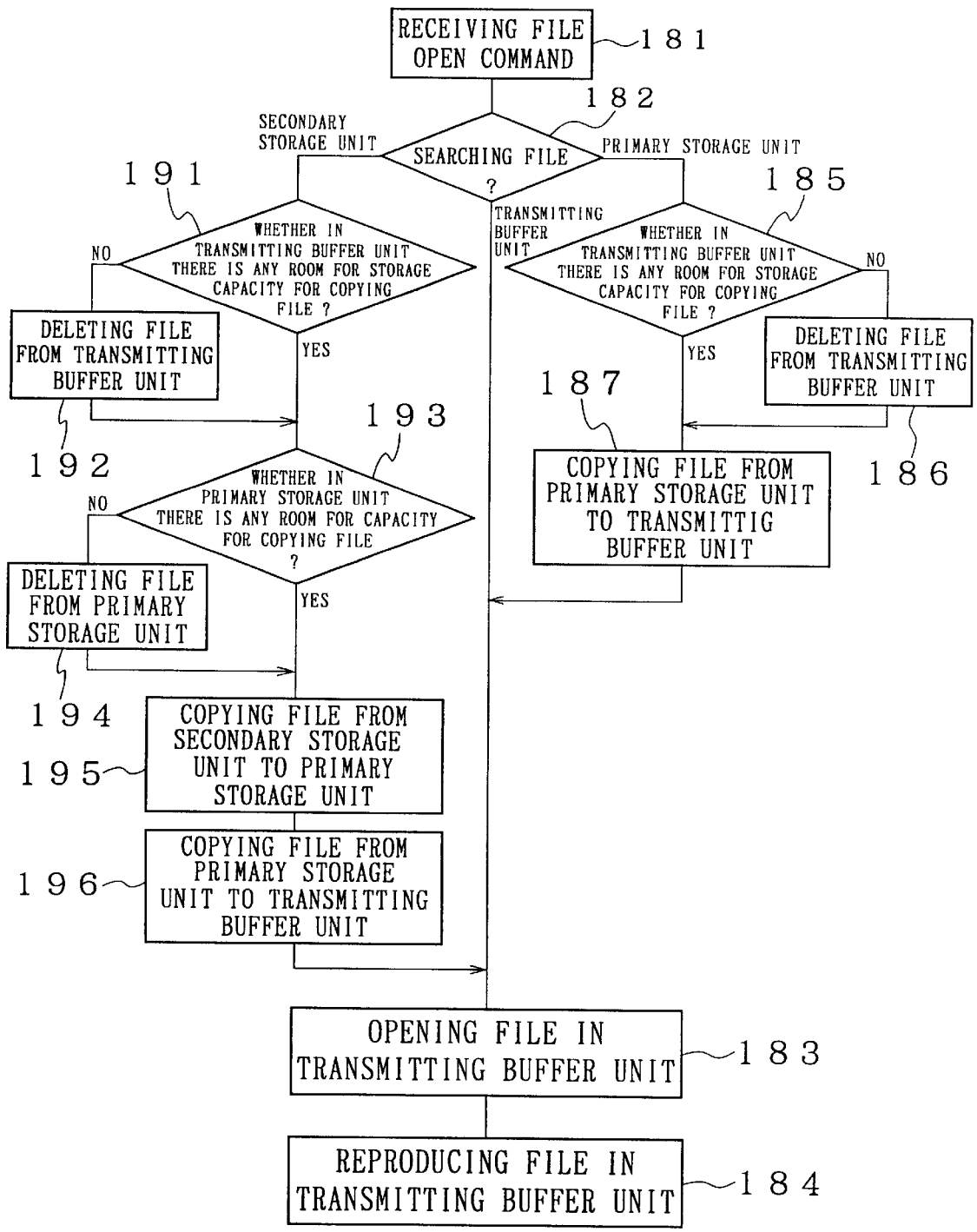
FIG. 15 is a flowchart showing an operation state when AV data are reproduced in the server control unit.
Figure 16:
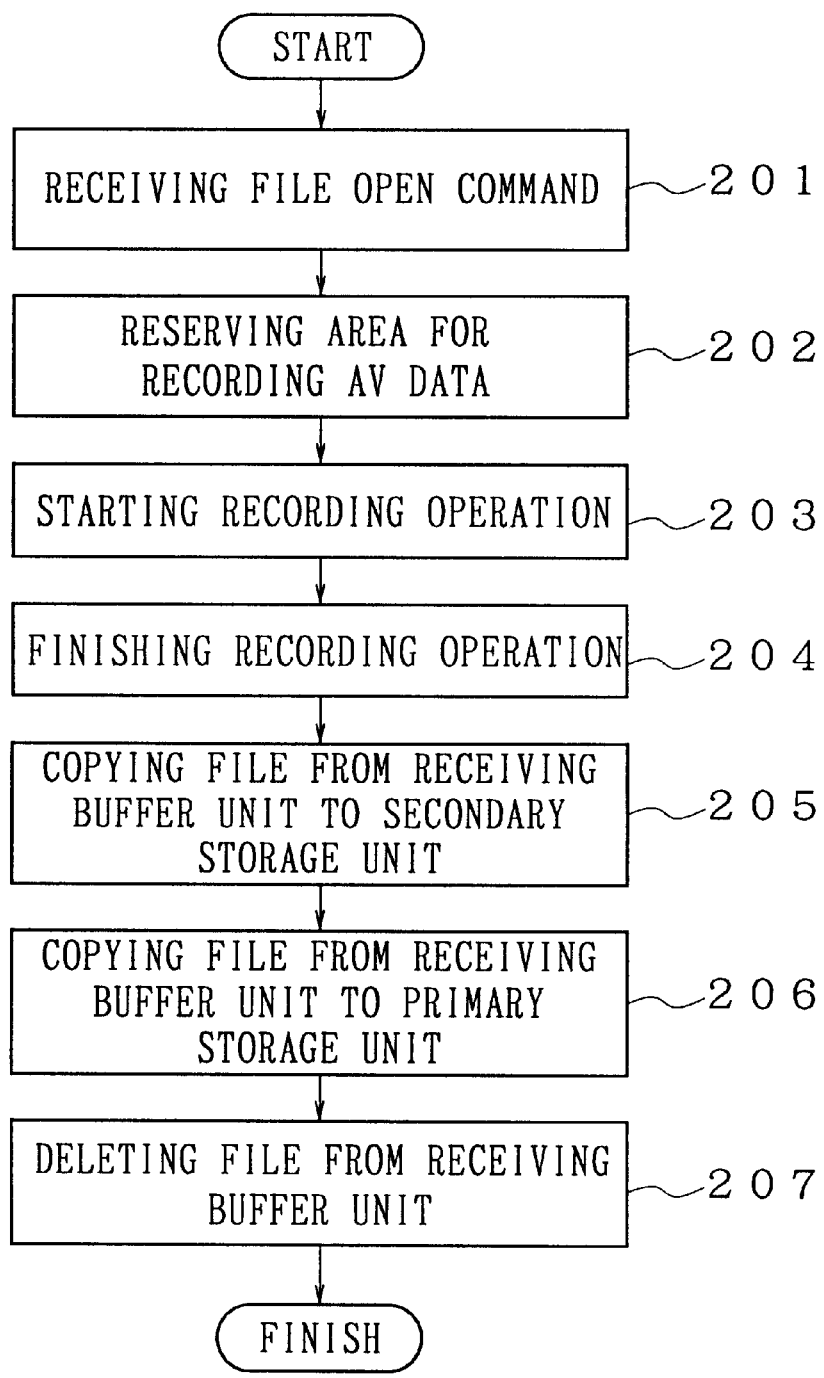
FIG. 16 is a flowchart showing an operation state when the AV data are recorded in the server control unit.

Next, the following will explain more in detail the operations of the server control unit 90 by using FIGS. 15 and 16. The server control unit 90 is an apparatus for controlling the whole of AV server device 10 and thus, explaining the operation of the server control unit 90 explains the operation of the whole of AV server device 10.

Herein, the transmitting buffer unit 50 uses the semiconductor memory as a recording medium and thus, the responsivity thereof for reproduction is high but the storage capacity thereof is limited. Therefore, it is impossible to store all files and all data in the transmitting buffer unit 50. On the other hand, the primary storage unit 60 uses a hard disk or the like as a recording medium. Thus, it is poorer in responsivity than the transmitting buffer unit 50 but it is richer in capacity than the unit 50. Further, it has lower cost per unit storage capacity than that of the semiconductor memory.

Also, the secondary storage unit 70 uses a magnetic tape, as a recording medium, which has lower cost per unit storage capacity than that of the primary storage device 60. Therefore, its responsivity is poorer than that of the primary storage device 60. However its storage capacity is more than those of the hard disk and the semiconductor memory, and may be increased easily by increasing the number of tape cassette, with little concern for a cost therefor.

Considering the above, capacity of the units 50, 60 and 70 of these 3 types is selected as follows:

The secondary storage unit 70>the primary storage unit 60>the transmitting buffer unit 50.

Thereby, hierarchical storage of the necessary files is carried out in the AV server system 10 in such a manner that files in the secondary storage unit 70 are transferred (copied) into the primary storage unit 60, or files in the primary storage unit 60 are transferred (copied) into the transmitting buffer unit 50, in accordance with the required responsivity and use frequency. In other words, an AV server system excellent in capacity and responsivity can be constructed by carrying out the hierarchical storage so that all files stored in the transmitting buffer unit 50 are possessed by the storage units 50 and 70, and all files in the primary storage unit 60 are possessed by the secondary storage unit 70.

In case in which, in copying the file stored in the primary storage unit 60 into the transmitting buffer unit 50, the transmitting buffer unit 50 has no room for the storage capacity, it is necessary to delete the unnecessary files which have already existed in the transmitting unit 50. In this case, likewise hierarchical file management control is carried out so that all files stored in the transmitting buffer unit 50 exist in the primary storage unit 60 and all files stored in the primary storage unit 60 exist in the secondary storage unit 70.

When, for example, an AV server system 10 runs commercials, such a hierarchical control that the transmitting buffer unit 50 stores all (corresponding to 10 minutes) of AV data for commercials which are broadcast in a program, the primary storage unit 60 stores all (corresponding to about 2 hours) of AV data for commercials which are broadcast for a week, and the secondary storage unit 70 stores all (corresponding to about 100 hours) of AV data for commercials which are (were) broadcast for a year, is carried out.

The following explains more in detail the control operations of server control unit 90, namely, those of the whole of AV server system 10, including such the hierarchical control, by using FIGS. 15 and 16.

Referring to FIG. 15, the operation for reproducing the files from the transmitting buffer unit 50 will be explained more in detail. FIG. 15 is a flow chart showing the reproducing process.

First, when the reproducing process starts, the CPU 94 of the server control unit 90 receives a reproducing command (file open command) of the required files from the application terminal 36 through the network 38 (step 181). The CPU 94 of the server control unit 90 searches, from the file information stored in the RAM 96, which units (50, 60 or 70) a specified file exists in (step 182). Where the specified file exists in the transmitting buffer unit 50, the server control unit 90 sends to transmitting buffer unit 50 the file open command that instructs the transmitting buffer unit 50 to transmit the desired file, and then the transmitting buffer unit 50 starts the operation of the specified file (opening the file) (step 183). Thereafter, the transmitting buffer unit 50 reads out the specified file from its memory to transmit the desired file from the transmitting buffer unit 50 (step 184).

On the other hand, where the specified file does not exist in the transmitting buffer unit 50 but exists in the primary storage unit 60, the server control unit 90 examines whether in the transmitting buffer unit 50 there is any room for storage capacity for copying the specified file (step 185).

When there is not any capacity room, namely, (NO) at step 185, the server control unit 90 deletes the unnecessary files from the transmitting buffer unit 50 and keeps capacity necessary for copying the specified file in the transmitting buffer unit 50 (step 186) and then the server control unit 90 copies the specified file from the primary storage unit 60 to the transmitting buffer unit 50 (step 187).

Then, the operation shifts to steps 183 and 184 wherein the server control unit 90 sends a file open command to the transmitting buffer unit 50 to open the specified file (step 183), and then the specified file is actually reproduced in the transmitting buffer unit 50 (step 184).

Where there is any capacity room in the transmitting buffer unit 50, namely, (YES) at step 185, the operation shifts to step 187 wherein the specified file are copied from the primary storage unit 60 to the transmitting buffer unit 50 (step 187) and then the specified file is opened (step 183), and is actually reproduced in the transmitting buffer unit 50 (step 184).

When the specified file exists only in the secondary storage unit 70 at step 182, neither in the transmitting buffer unit 50 nor the primary storage unit 60, the server control unit 90 examines whether or not in the transmitting buffer unit 50 there is a room for capacity for copying the specified file (step 191).

When there is no room for the capacity, namely, NO at step 191, the server control unit 90 deletes an unnecessary file in the transmitting buffer unit 50 to keep capacity necessary for copying the file (step 192) and then the operation shifts to step 193.

When there is a room for the capacity in the transmitting buffer unit 50, namely, YES at step 182, the operation shifts to step 193 wherein the server control unit 90 examines whether or not there is a room for capacity for copying the specified file in the primary storage unit 60 (step 193).

When there is no room for the capacity, namely, NO at step 193, the server control unit 90 deletes an unnecessary file from the primary storage unit 60 to keep capacity necessary for copying the file (step 194) and the operation shifts to step 195.

When there is a room for the capacity in the primary storage unit 60, namely, YES at step 193, the operation shifts to step 195 wherein the server control unit 90 copies the specified file from the secondary storage unit 70 to the primary storage unit 60 (step 195). After this copying is finished, the specified file is copied from the primary storage unit 60 to the transmitting buffer unit 50 (step 196).

After the copying the specified file to the primary storage unit 60 and the transmitting buffer unit 50 is finished, the server control unit 90 sends a file open command to the transmitting buffer unit 50 to open the specified file and to transmit the specified file from the transmitting buffer unit 50 to the outside (steps 183 and 184).

In this way, the hierarchical file management control, namely, when the specified file is stored in the transmitting buffer unit 50, the same specified file is stored in the primary storage unit 60 and the secondary storage unit 70, can be implemented.

As a method for selecting a file to be deleted from the transmitting buffer unit 50 or the primary storage unit 60, the following algorithms are mentioned. For example, the use frequency of each of the files stored in each the units is recorded for a set period of time and the recorded files are deleted in order that use frequency is lower. Further, the date of actual use (copying and/or transferring) of each of the files stored in each the units is recorded and the recorded files are deleted in order that the date of last use is older. Additionally, a protection level is beforehand set to each of the files and the files are deleted in order that the protection level is lower. Still further, files are deleted in order that the files were copied in the each of the units (for example, in order that the last copy is older or newer).

These algorithms are applicable to this invention, but the algorithms of this invention are not restricted to these. These algorithms are incorporated as programs into the RAM 95 in the server control unit 90.

It is just before broadcasting the program actually that the specified file is copied from the primary and secondary storage units 60 and 70 to the transmitting buffer unit 50. Therefore, this requires the real time transmitting about transmitting the file from the transmitting buffer unit 50. However, this does not require the real time transferring about transferring the file between the primary storage unit 60 and the transmitting buffer unit 50 as well as the secondary storage unit 70 and the primary storage unit 60. Therefore, the transfer of the data to the transmitting buffer unit 50 may finish before the file is transmitted from the transmitting buffer unit 50 and thus, this does not require so fast speed for transferring the file between the transmitting buffer unit 50 and the primary and secondary storage units 60 and 70.

The following explains more in detail the recording operations of server control unit 90, namely, those of the whole of AV server system 10 by using FIG. 16.

FIG. 16 is a flowchart showing such a recording operation. Herein, an example for carrying out the control such that a file stored in the receiving buffer device 40 will be stored in both the secondary storage unit 70 and the primary storage unit 60, is shown.

First, when the recording operation starts, the server control unit 90 receives from the application terminal 36 a control command ordering that the AV data are stored in the AV server system 10. The second network interface 93 of server control unit 90 receives said control command and transfers it to the CPU 94 through the internal bus 92. Under the control of the control command, the CPU 94 sends the file open command to the receiving buffer unit 40 through the first network interface 91 and the subnetwork 59 (step 201). Said file open command instructs the receiving buffer unit 40 to start the operation of the file that stores the AV data, and to record them.

When the receiving buffer unit 40 receives the file open command from the server control unit 90, the receiving buffer unit 40 reserves the recording area therein for recording the received AV data (step 202).

After the receiving buffer unit 40 keeps an area for recording, AV data are recorded actually (step 204) and the recording operation is finished (step 204).

Next, the server control unit 90 transfers (copies) the file recorded in the receiving buffer unit 40 to the secondary storage unit 70 (step 205). Then, the server control unit 90 transfers (copies) the file recorded in the secondary storage unit 90 to the primary storage unit 60 and/or the transmitting storage unit 50, as necessary, under the above hierarchical file management control. Moreover, after the file is copied from the receiving buffer unit 40 to the secondary storage unit 70, the server control unit 90 copies the file from the receiving buffer unit 40 to the primary storage unit 60 (step 206).

After copying the file, said file becomes unnecessary in the receiving buffer unit 40. Thus, the server control unit 90 deletes the unnecessary file existing in the receiving buffer unit 40 (step 207). Thereby, the recording operation of the received AV data is finished.

Next, modifications of the present invention will be explained by using FIGS. 17 through 21.

Figure 17:
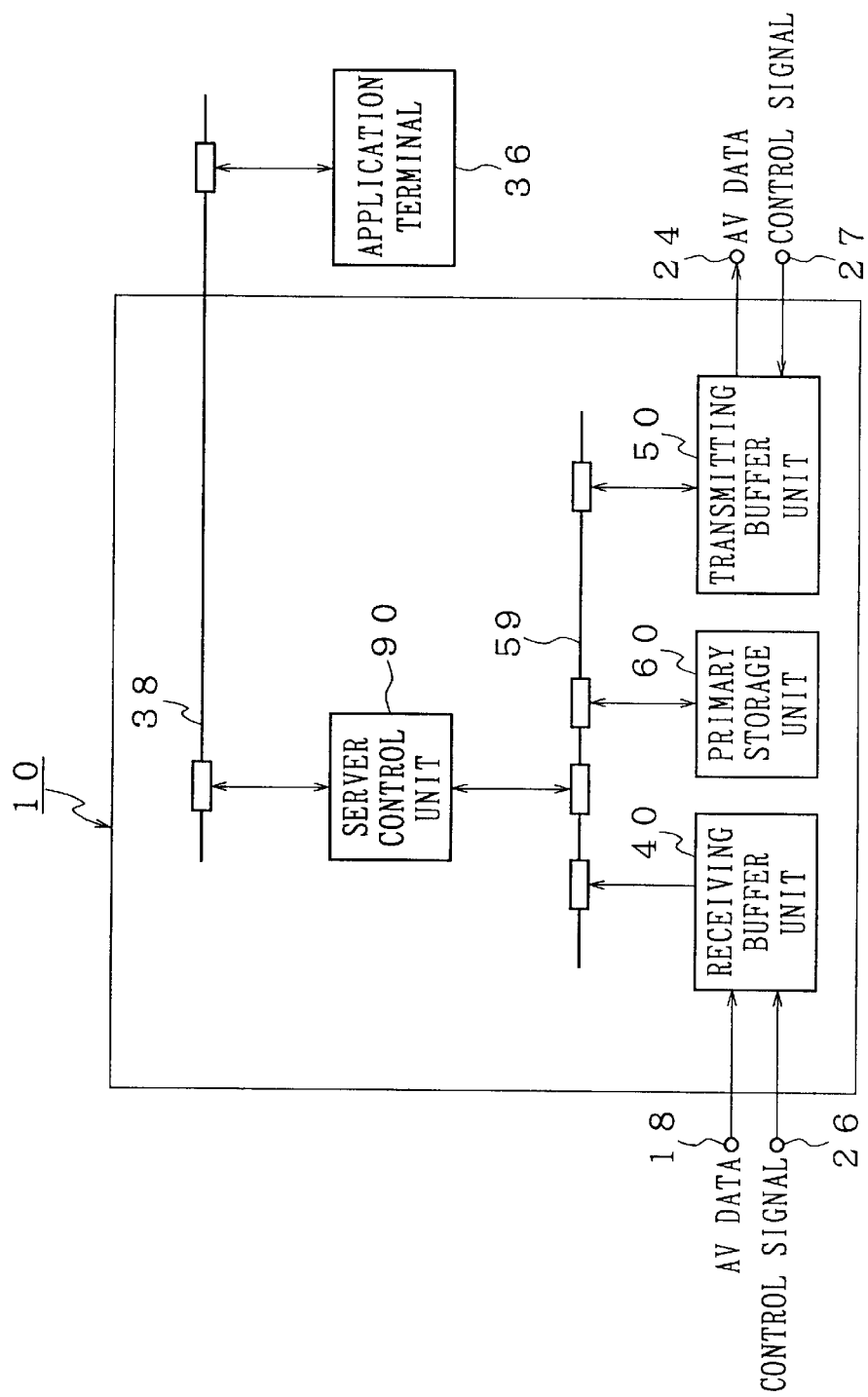
FIG. 17 is a modification (No. 1) of the AV server device.

FIG. 17 shows an AV server device 10 in which its storage means is composed of only the primary storage unit 60. This AV sever device 10 has a limited storage capacity as compared with the AV server device 10 as shown in FIG. 1 but may be used in the broadcasting station where there is only a relatively small area for installing said device 10.

Figure 18:
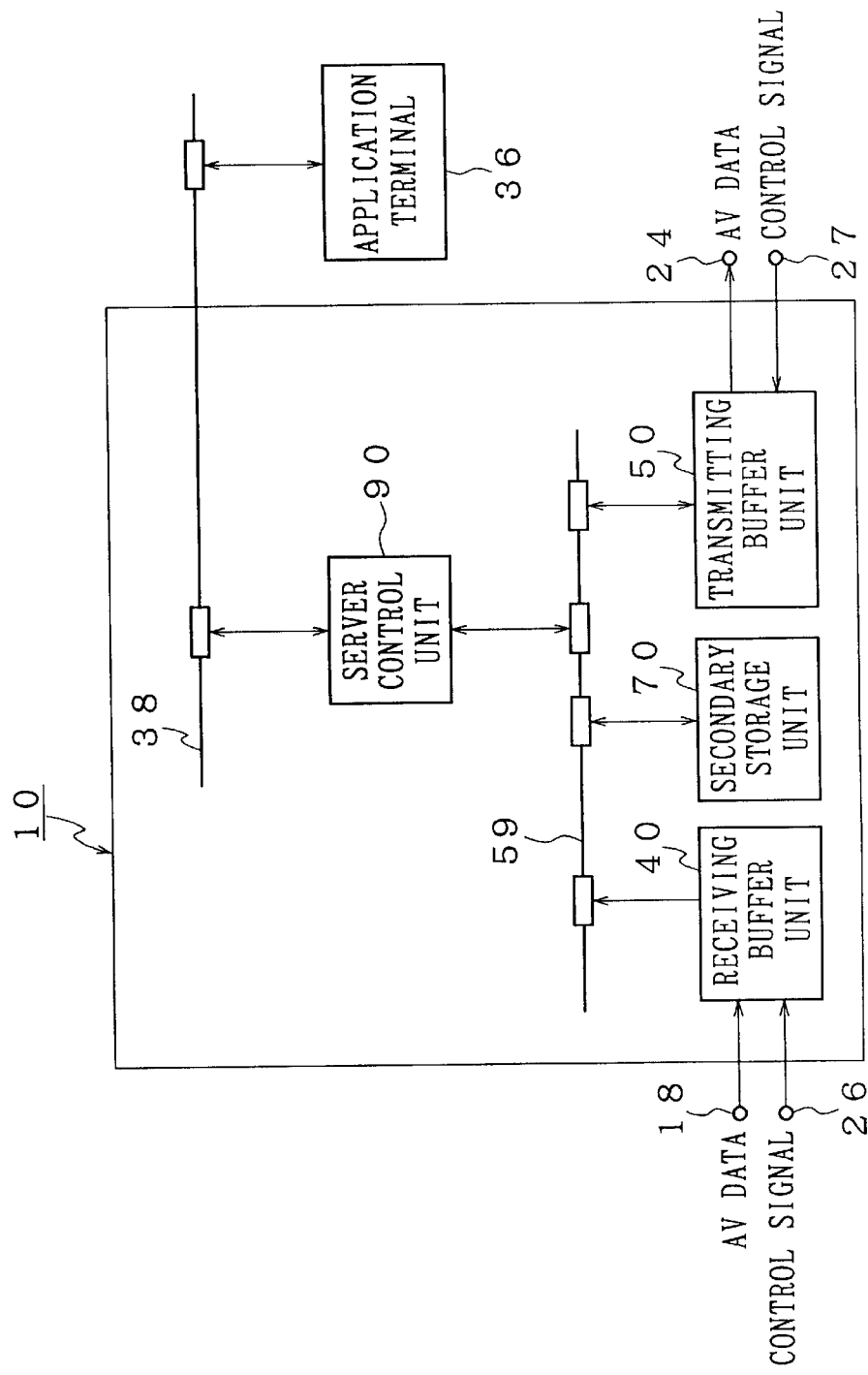
FIG. 18 is a modification (No. 2) of the AV server device.

FIG. 18 shows an AV server device 10, which is different from the above in that its storage unit is composed of only the secondary storage unit 70. The storage unit composed of tape cassette auto-changer, using a magnetic tape as a recording medium, has been introduced in the broadcasting station and thus, the AV server device 10 may be composed of such the storage unit.

Figure 19:
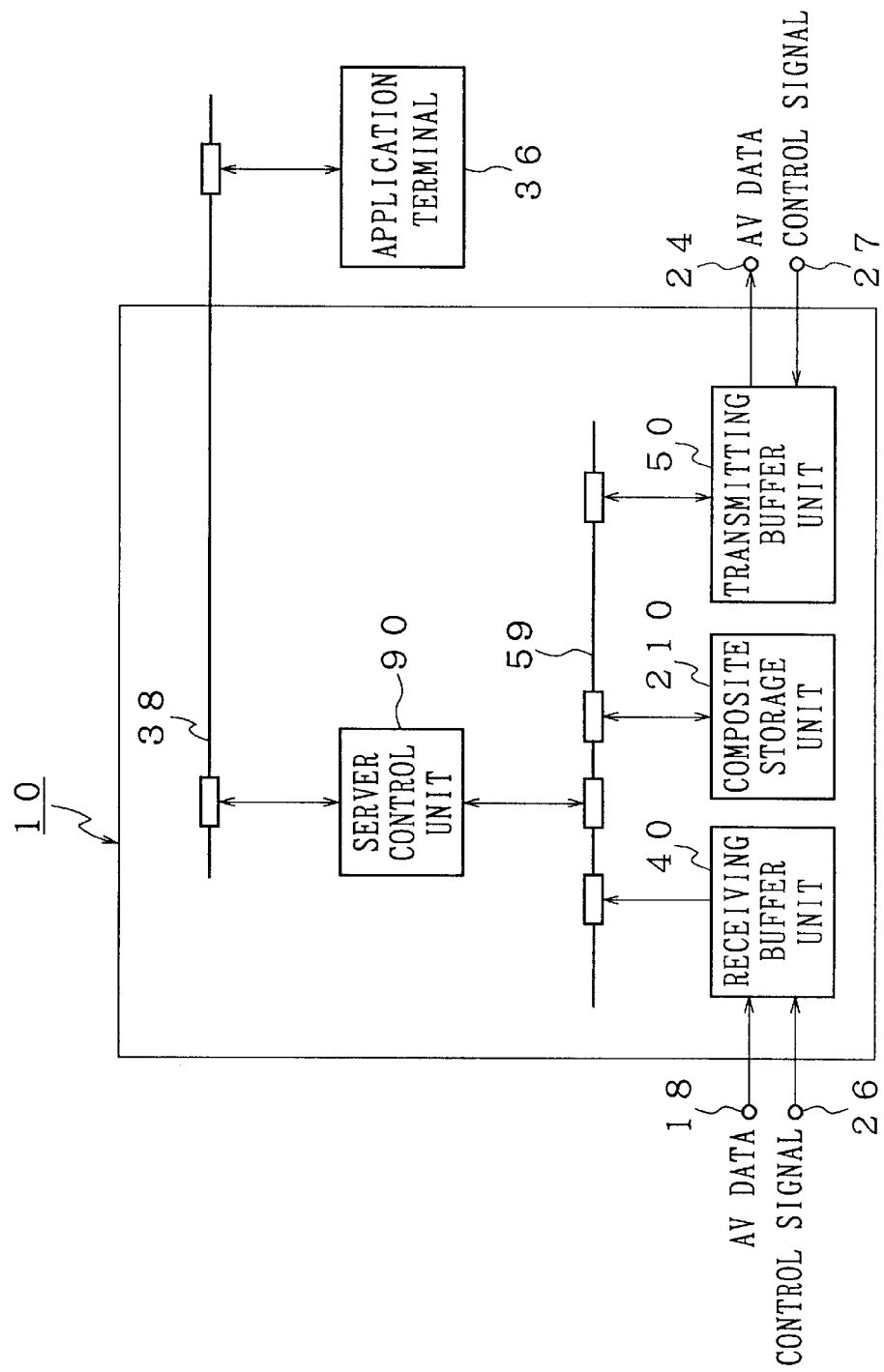
FIG. 19 is a modification (No. 3) of the AV server device.

FIG. 19 shows an AV server device 10 using as the storage means a composite storage unit 210 wherein the primary storage unit 60 and the secondary storage unit 70 are connected to each other by means of an internal bus. In this device 10, the above real time processing is not required between the first and second storage units 60 and 70 and thus, there is no problem in connecting the two units 60 and 70 by means of the internal bus.

Figure 20:
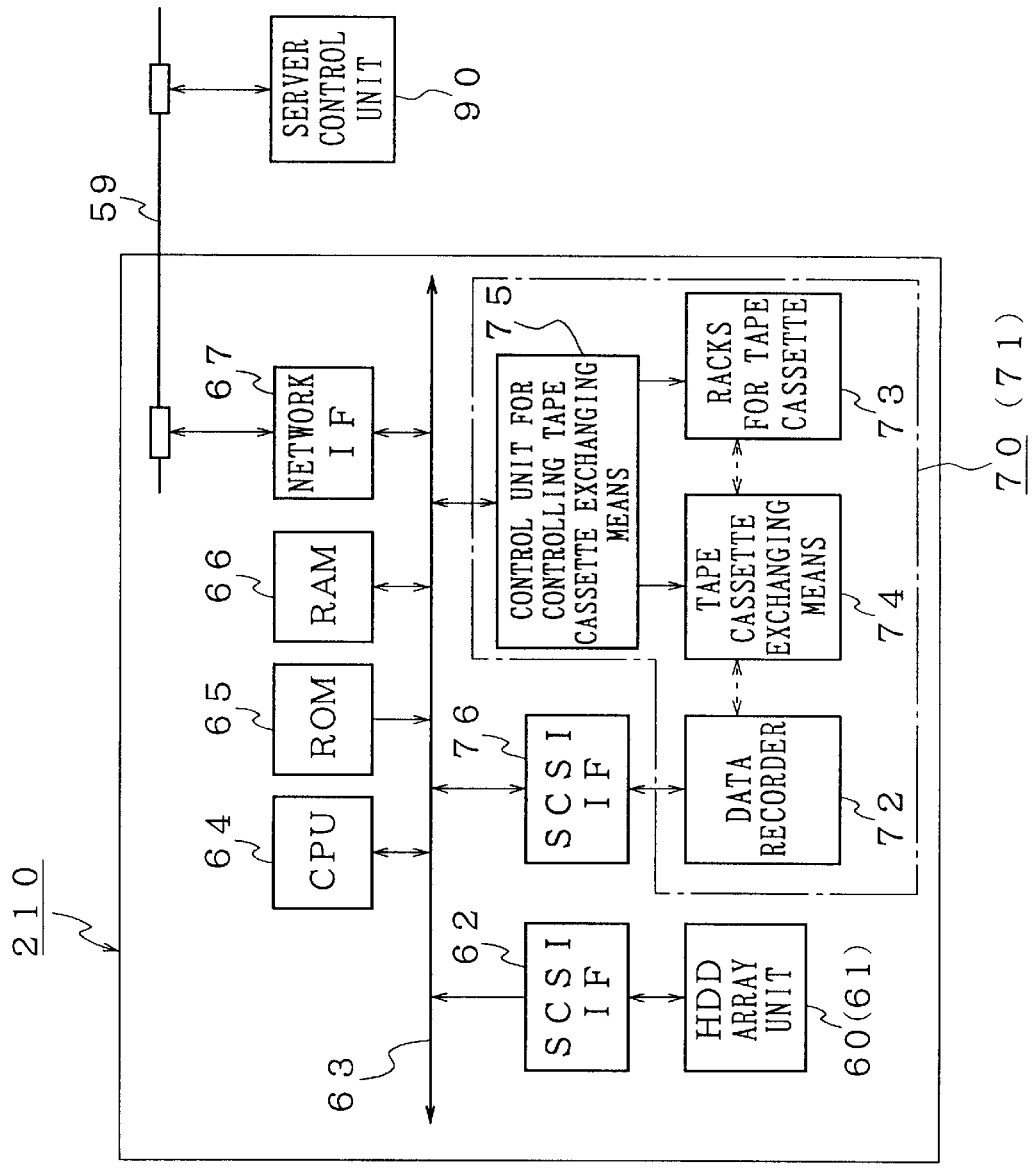
FIG. 20 is a systematic view showing an embodiment of a composite storage unit.

FIG. 20 shows a structure example of the composite storage unit 210. As shown in FIG. 20, the composite storage unit 210 comprises a disk array unit 61 for the primary storage unit 60, a tape cassette auto-changer 71 for the secondary storage unit 70 and the internal bus 63 connected between them. Each of these disk array unit 61 and auto-changer 71 is connected with the internal bus 63 through the two SCSI interfaces 62 and 76, but other structures are not altered. Further, ROM 65 includes the control programs for controlling both of the above first and second storage units 60 and 70.

Figure 21:
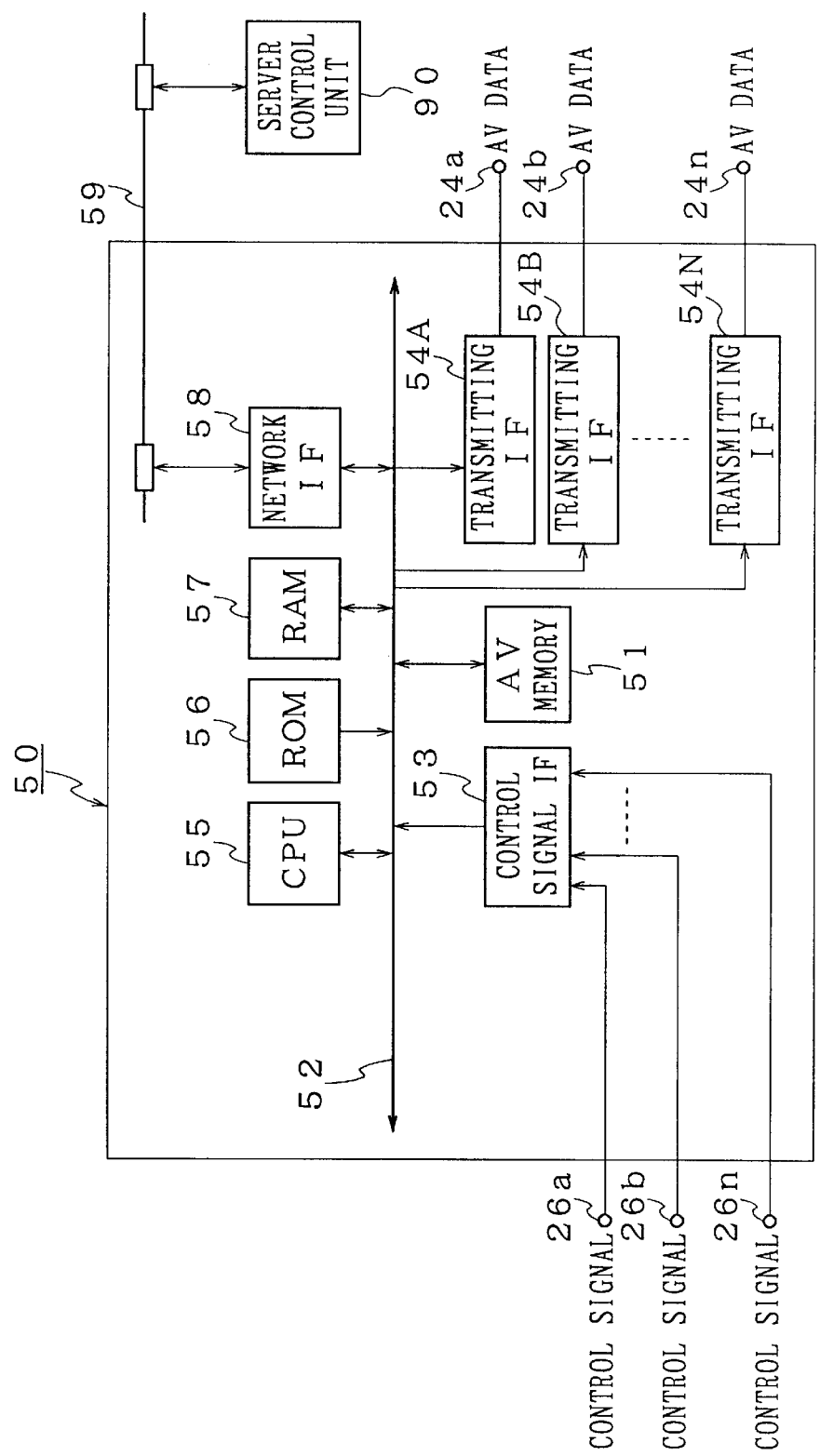
FIG. 21 is a modification of the transmitting buffer unit.

FIG. 21 shows a specific example of the transmitting buffer device 50 in case where this AV server device 10 is applied to an NVOD (Near Video On Demand) device. Depending on the number of handled channels, a plurality of control signals are supplied to a control signal interface 53 through terminals 26a, 26b. . . 26n, and further a plurality of transmitting interfaces 54A, 54B . . . 54N are also disposed. By these, a plurality of the same AV data are repeatedly reproduced and transmitted with the shift of time. In this case, an original material is single and the transmissions are plural. Thus, by the structure shown in FIG. 21, the AV memory 51 can be saved.

Since in the aforementioned structure the storage unit(s) is (are) connected to the subnetwork 59, the capacity of the primary storage unit 60 and/or that of the secondary storage unit 70 can be altered without having any influence on the other units. Also, by appropriately adjusting capacity of the transmitting buffer unit 50, the primary storage unit 60 and the secondary storage unit 70, a low-priced AV server device 10 having large capacity can be constructed.

As another modification of the invention, in the AV server device 10, the receiving buffer unit 40, the storage units 60 and 70 and transmitting buffer unit 50 may be connected with each other by means of the different subnetwork, not shown, in addition to the above normal subnetwork. This is because the load on the network with reference to the AV data, particularly, video data is considered. Further, the control data may be transferred on the subnetwork 59 as shown in FIG. 1 etc., and the receiving buffer unit 40, the storage units 60 and 70 and transmitting buffer unit 50 may be connected with each other by means of the network means, for example, a coaxial cable, different from the subnetwork 59. In this case, and the AV data are transferred on said network in the SDI (Serial Data Interface) signal format standardized by the SMPTE-259M. Additionally, the AV data may be transferred to the units in the SDTI (Serial Data Transfer Interface) signal format standardized by the SMPTE-305M. Each of the units may be connected by the various interfaces, for example, fiber channel, known as a very fast serial interface.

As described above, the following advantages can be obtained according to the present invention.

1. Since a receiving buffer unit, a transmitting buffer unit, a storage unit and the like are constructed through a network means, the number of receiving channels and that of transmitting channels can be decided without restriction by hardware. Thus, it is not feared that, as in the prior art, it is limited by capacity of an internal bus.

2. Since a receiving buffer unit, a transmitting buffer unit, a storage unit and the like are connected to each other by means of a network means, their physical arrangement or distances are not limited when these units are arranged. Thus, discrete arrangement can be implemented.

3. Since data transfer among a storage means, a receiving unit and a transmitting buffer unit is implemented as communication on an ordinary network means and the desired AV data are reproduced at real time from the transmitting buffer unit, real time processing between the receiving buffer unit and the storage unit and between the storage unit and the transmitting buffer unit is not required.

Therefore, this makes it possible to take measures for keeping reliability of the storage unit sufficiently, and consequently, for example, in case where a disk array unit or the like is used, the number of retry thereto can be set a larger value. This makes it possible to improve reliability of the disk array unit to a large extent.

4. Furthermore, AV data or the like stored in the transmitting buffer unit are reproduced on the basis of a reproducing command, and consequently the present invention has such characteristics that responsivity to the reproducing command can be improved to a large extent.

Accordingly, the apparatus according to this invention is suitable for being applied to an AV server system for handling AV data.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

We claim:

1. An apparatus for storing and transmitting data including audio and/or video data comprising:
    a data receiving means for receiving audio/video data and external control signals; said data receiving means having a receiving interface for connecting to an external audio/video data source and a first audio/video memory for temporarily storing the received audio/video data;
    a first storage means for storing audio/video data from said first audio/video memory of said data receiving means;
    a second storage means for storing audio/video data;
    a data transmitting means for transmitting audio/video data and receiving external control signals; said data transmitting means having at least one transmitting interface for outputting audio/video data and a second audio/video memory for temporarily storing audio/video data to be transmitted; and
    a main control means for controlling said data receiving means, said data transmitting means, said first storage means and said second storage means so that said second storage means stores at least the audio/video data stored temporarily in the second audio/video memory and said first storage means stores at least the audio/video data stored in the second storage means, said main control means being linked to said data receiving means, said transmitting means, said first storage means and said second storage means by a network means.

2. An apparatus according to claim 1, wherein said first storage means comprises a tape recording medium for storing audio/video data.

3. An apparatus according to claim 1, wherein said first storage means comprises:
    a plurality of racks for storing tape cassettes;
    a recording and reproducing means for recording audio/video data received by said data receiving means on said tape cassettes and for reproducing audio/video data recorded on said tape cassettes; and
    a carrying means for selectively carrying said tape cassettes between said rack and said recording and reproducing means.

4. An apparatus according to claim 3, wherein said first storage means further comprises a network interface for interfacing with said network means and a first control means for controlling the input and output of audio/video data from said first storage means.

5. An apparatus according to claim 1, wherein said second storage means comprises a randomly accessible recording medium for storing audio/video data.

6. An apparatus according to claim 1, wherein said second storage means comprises a disk array unit having a plurality of hard disk drives connected in parallel, each hard disk of said disk array unit for storing audio/video data.

7. An apparatus according to claim 6, wherein said second storage means further comprises a network interface for interfacing with said network means, and a second control means for controlling the input and output of audio/video data from said second storage means.

8. An apparatus according to claim 1, wherein said data transmitting means further comprises a network interface for interfacing with said network means and a transmitting control means for controlling the transfer of audio/video data to be transmitted at a set time between said second audio/video memory and said at least one transmitting interface.

9. An apparatus according to claim 1, wherein said main control means controls the transfer of audio/video data between said first storage means, said second storage means and said data transmitting means through said network means.

10. An apparatus according to claim 1, wherein said main control means controls the transfer of audio/video data between said first storage means, said second storage means and said data transmitting means such that audio/video data to be transmitted is transferred sequentially from said first storage means, through said second storage means and into said data transmitting means as the data is transmitted; said data being transferred by deleting the transmitted data in said data transmitting means, transferring other data from said second storage means into said data transmitting means to replace the deleted transmitted data, deleting the transferred other data in said second storage means, and transferring still other data from said first storage means into said second storage means to replace the deleted transferred other data.

11. An apparatus according to claim 1 further comprising an application terminal connected to said main control means through the network means, wherein said main control means controls said data transmitting means by a control command received from said application terminal so that said data transmitting means transmits the audio/video data stored temporarily therein.

12. A method of storing and transmitting data including audio and/or video data comprising the steps of:

receiving audio/video data and external control signals using a data receiving unit; said data receiving unit having a receiving interface for connecting to an external audio/video data source and a first audio/video memory for temporarily storing the received audio/video data;

storing audio/video data from said first audio/video memory of said data receiving unit in a first storage unit;

transmitting audio/video data and receiving external control signals using a data transmitting unit; said data transmitting unit having at least one transmitting interface for outputting audio/video data and a second audio/video memory for temporarily storing audio/video data to be transmitted; and controlling said data receiving unit, said data transmitting unit, said first storage unit and said second storage unit via a main control unit so that a second storage unit stores at least the audio/video data stored temporarily in the second audio/video memory and said first storage unit stores at least the audio/video data stored in the second storage unit, said main control unit being linked to said data receiving unit, said transmitting unit, said first storage unit and said second storage unit by a network.

13. The method according to claim 12, wherein said first storage unit comprises a tape recording medium for storing audio/video data.

14. The method according to claim 12, wherein said first storage unit comprises:

a plurality of racks for storing tape cassettes;

a recording and reproducing unit for recording audio/video data received by said data receiving unit on said tape cassettes and for reproducing audio/video data recorded on said tape cassettes; and a carrying unit for selectively carrying said tape cassettes between said rack and said recording and reproducing unit.

15. The method according to claim 14, further comprising the step of controlling the input and output of audio/video data from said first storage unit via a network interface for interfacing said first storage unit with said network.

16. The method according to claim 12, wherein said second storage unit comprises a randomly accessible recording medium for storing audio/video data.

17. The method according to claim 12, wherein said second storage unit comprises a disk array unit having a plurality of hard disk drives connected in parallel, each hard disk of said disk array unit for storing audio/video data.

18. The method according to claim 17, further comprising the step of controlling the input and output of audio/video data from said second storage unit via a network interface for interfacing said second storage unit with said network.

19. The method according to claim 12, further comprising the step of controlling the transfer of audio/video data to be transmitted at a set time between said second audio/video memory and said at least one transmitting interface using a transmitting control unit.

20. The method according to claim 12, further comprising the step of controlling the transfer of audio/video data between said first storage unit, said second storage unit and said data transmitting unit through said network.

21. The method according to claim 12, further comprising the step of controlling the transfer of audio/video data between said first storage unit, said second storage unit and said data transmitting unit such that audio/video data to be transmitted is transferred sequentially from said first storage unit, through said second storage unit and into said data transmitting unit as the data is transmitted; said data being transferred by deleting the transmitted data in said data transmitting unit, transferring other data from said second storage unit into said data transmitting unit to replace the deleted transmitted data, deleting the transferred other data in said second storage unit, and transferring still other data from said first storage unit into said second storage unit to replace the deleted transferred other data.

22. The method according to claim 12, further comprising the step of controlling said data transmitting unit by a control command received from an application terminal connected to said main control unit through the network so that said data transmitting unit transmits the audio/video data stored temporarily therein.

* * * * *